United States Patent
Johansson et al.

(10) Patent No.: US 11,048,647 B1
(45) Date of Patent: Jun. 29, 2021

(54) MANAGEMENT OF RESOURCES IN A MODULAR CONTROL SYSTEM

(71) Applicant: Axis AB, Lund (SE)

(72) Inventors: Marcus Johansson, Lund (SE); Emil Selinder, Lund (SE); Jon Malmquist, Lund (SE); Johan Rönnåker, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/731,890

(22) Filed: Dec. 31, 2019

(51) Int. Cl.
*G06F 13/10* (2006.01)

(52) U.S. Cl.
CPC .......... *G06F 13/10* (2013.01); *G06F 2213/40* (2013.01)

(58) Field of Classification Search
CPC .... G06F 13/10; G06F 2213/40; G06F 9/4413; G06F 9/4411; G06F 12/0646; G06F 13/387; G06F 13/385; G06F 9/4415; G05B 2219/1157
See application file for complete search history.

(56) References Cited

U.S. PATENT DOCUMENTS

| | | | |
|---|---|---|---|
| 5,535,326 A | 7/1996 | Baskey et al. | |
| 5,745,694 A | 4/1998 | Egawa et al. | |
| 6,473,824 B1 * | 10/2002 | Kreissig | G06F 13/102 348/222.1 |
| 6,735,756 B1 * | 5/2004 | Linn | G06F 9/44521 716/116 |
| 7,574,713 B2 * | 8/2009 | Tabares | G06F 9/4411 710/10 |
| 2001/0032256 A1 | 10/2001 | Sondur et al. | |
| 2004/0003078 A1 | 1/2004 | Todd et al. | |
| 2005/0120145 A1 * | 6/2005 | Andres | G06F 13/102 710/8 |
| 2005/0278441 A1 | 12/2005 | Bond et al. | |
| 2006/0004930 A1 * | 1/2006 | Patino | G06F 13/4081 710/16 |
| 2009/0234934 A1 | 9/2009 | Ong | |
| 2011/0246680 A1 * | 10/2011 | Chassot | G06F 13/102 710/15 |
| 2014/0245451 A1 | 8/2014 | Le Sant | |
| 2015/0355613 A1 | 12/2015 | Palmer | |

(Continued)

OTHER PUBLICATIONS

Wikipedia: Dependency injection. Accessed online Sep. 30, 2020; http://web.archive.org/web/20190604055736/en.wikipedia.org/wiki/Dependency_injection; 17 pages.

(Continued)

*Primary Examiner* — Raymond N Phan
(74) *Attorney, Agent, or Firm* — Snyder, Clark, Lesch & Chung, LLP

(57) ABSTRACT

A device may include a memory storing instructions and a processor configured to execute the instructions to receive, from a configuration client device, a request to register a resource; and identify a domain object associated with the resource, wherein the domain object corresponds to a logical entity representing a device or port, or corresponds to a logical entity controlling another resource included in another domain object. The processor may be further configured to select a domain object handler for the identified domain object; register the identified domain object with the selected domain object handler; and use the selected domain object handler to process messages associated with the registered domain object.

20 Claims, 20 Drawing Sheets

(56) References Cited

U.S. PATENT DOCUMENTS

| | | |
|---|---|---|
| 2016/0234186 A1 | 8/2016 | Leblond et al. |
| 2017/0031955 A1 | 2/2017 | Kenchammana-Hosekote et al. |
| 2018/0136979 A1 | 5/2018 | Morris |
| 2019/0042508 A1* | 2/2019 | Raghav ............... G06F 12/0692 |

OTHER PUBLICATIONS

Wikipedia: XenApp. Accessed online Sep. 30, 2020; http://web.archive.org/web/20190403155533/en.wikipedia.org/wiki/XenApp; 3 pages.

Wikipedia: X Window System. Accessed online Sep. 30, 2020; http://web.archive.org/web/20190603111122/en.wikipedia.org/Wiki/X_Window_System; 22 pages.

* cited by examiner

POST command to installation/doors          650

```
{
    "name": "My Front Door",
    "maxOpenTime": "PT20S",            652
    "myLock":
    {
        "type": "private",
        "target": "installation/locks",    654
        "data":
        {
            "name": "My Lock",             656
            "myOutput":
            {
                "type": "use",
                "target": "installation/relays/1"
            }
        }
    }
}
```

| LINK ID = 169321 | |
|---|---|
| FIRST RESOURCE | DOOR A READER |
| FIRST ENDPOINT | PROCESSID = 5834 |
| SECOND RESOURCE | GPIO 4 |
| SECOND ENDPOINT | PROCESSID = 6324 |
| PATH TYPE | SOCKET |
| PATH | SYS/SOCKETS/ DOORA_READER_SOCKET_1 |

| DOMAIN OBJECT FUNCTIONS |
|---|
| FUNCTION TO RECEIVE DATA FROM CARD READER DEVICE ~1262 |
| FUNCTION TO CONTROL INDICATOR IN CARD READER DEVICE ~1264 |

FIG. 12D

MANAGEMENT OF RESOURCES IN A MODULAR CONTROL SYSTEM

FIELD

This disclosure generally relates to access control systems, and more specifically, to a modular physical access control system.

BACKGROUND INFORMATION

A physical access control system may include components that communicate and coordinate their actions to achieve a set of tasks. For example, a controller device may control multiple peripheral devices that communicate with the controller or with each other. Managing multiple devices in a physical access control system may pose various challenges.

SUMMARY

According to one aspect, a method, performed by a computer device, may include receiving, by the computer device and from a configuration client device, a request to register a resource; identifying, by the computer device, a domain object associated with the resource, wherein the domain object corresponds to a logical entity representing a device or port, or corresponds to a logical entity controlling another resource included in another domain object; selecting, by the computer device, a domain object handler for the identified domain object; registering, by the computer device, the identified domain object with the selected domain object handler; and using, by the computer device, the selected domain object handler to process messages associated with the registered domain object.

Additionally, the method may include determining a domain object type associated with the identified domain object; and selecting the domain object handler based on the determined domain object type.

Additionally, the method may include receiving an update request from the configuration client device for the registered domain object, and the update request may include an instruction to add a link selector to the identified domain object; and updating the registered domain object based on the received update request.

Additionally, the method may include assigning a process identifier to the registered domain object, and the process identifier may be associated with the selected domain object handler.

Additionally, the method may include maintaining state information associated with the registered domain object, and the state information may indicate a state of the device or port, or of the other resource.

Additionally, the method may include defining a script for the registered domain object, and the script may specify a particular instruction to be sent to the device or port or the other resource when a particular type of event is detected by the registered domain object.

Additionally, the script may define an access rule that grants or denies access to an area by controlling the device or port or the other resource.

Additionally, the registered domain object may control at least one of a door, a lock, a relay, an input/output port, an access credentials input device, or a door actuator.

Additionally, the method may include generating a collection of resources under a service; and exposing the collection of resources to the configuration client device when a configuration client accesses the service.

Additionally, the method may include identifying a link selector associated with the registered domain object, wherein the link selector corresponds to an attribute of the domain object that specifies how a target resource of another domain object is to be controlled by the registered domain object; generating a contract between the registered domain object and the other domain object, wherein the contract indicates that the registered domain object is to control the target resource of the other domain object and that the target resource is not available to be controlled by other domain objects; and generating a communication path from the registered domain object to the other domain object based on the identified link selector.

According to another aspect, a device may include a memory storing instructions; and a processor configured to execute the instructions to receive, from a configuration client device, a request to register a resource; identify a domain object associated with the resource, wherein the domain object corresponds to a logical entity representing a device or port, or corresponds to a logical entity controlling another resource included in another domain object; select a domain object handler for the identified domain object; register the identified domain object with the selected domain object handler; and use the selected domain object handler to process messages associated with the registered domain object.

Additionally, the processor may be further configured to determine a domain object type associated with the identified domain object; and select the domain object handler based on the determined domain object type.

Additionally, the processor may be further configured to receive an update request from the configuration client device for the registered domain object, and the update request may include an instruction to add a link selector to the identified domain object; and update the registered domain object based on the received update request.

Additionally, the processor may be further configured to assign a process identifier to the registered domain object, and the process identifier may be associated with the selected domain object handler.

Additionally, the processor may be further configured to maintain state information associated with the registered domain object, and the state information may indicate a state of the device or port, or of the other resource.

Additionally, the processor may be further configured to define a script for the registered domain object, and the script may define an access rule that grants or denies access to an area by controlling the device or port or the other resource.

Additionally, the registered domain object may control at least one of a door, a lock, a relay, an input/output port, an access credentials input device, or a door actuator.

Additionally, the processor may be further configured to generate a collection of resources under a service; and expose the collection of resources to the configuration client device when a configuration client accesses the service.

Additionally, the processor may be further configured to identify a link selector associated with the registered domain object, wherein the link selector corresponds to an attribute of the domain object that specifies how a target resource of another domain object is to be controlled by the registered domain object; generate a contract between the registered domain object and the other domain object, wherein the contract indicates that the registered domain object is to control the target resource of the other domain object and that the target resource is not available to be controlled by other domain objects; and generate a communication path from the registered domain object to the other domain object based on the identified link selector.

According to yet another aspect, a non-transitory computer-readable memory device storing instructions executable by a processor, may include one or more instruction to receive, from a configuration client device, a request to register a resource; one or more instruction to identify a domain object associated with the resource, wherein the domain object corresponds to a logical entity representing a device or port, or corresponds to a logical entity controlling another resource included in another domain object; one or more instruction to select a domain object handler for the identified domain object one or more instruction to register the identified domain object with the selected domain object handler; and one or more instruction to use the selected domain object handler to process messages associated with the registered domain object.

BRIEF DESCRIPTION OF THE DRAWINGS

FIG. 6C is a diagram of exemplary code to configure resources the resource of FIG. 6B according to an embodiment;

FIGS. 12A-12D are diagrams of an exemplary domain object according to one embodiment;

DETAILED DESCRIPTION

Figure 1:
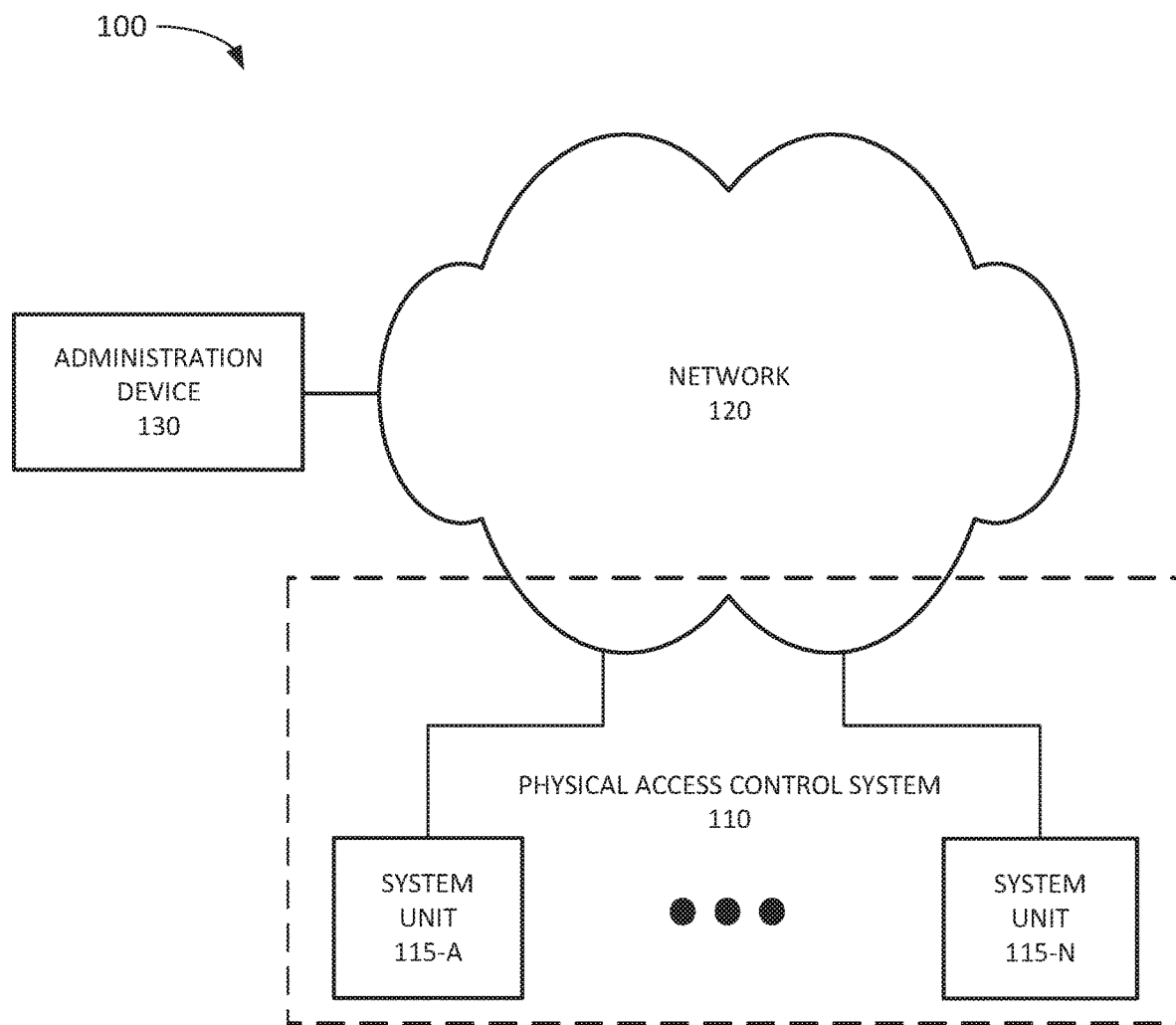
FIG. 1 is a block diagram illustrating an exemplary environment in an embodiment.

The following detailed description refers to the accompanying drawings. The same reference numbers in different drawings identify the same or similar elements.

A control system may include one or more controllers, each controlling a different part of the system. A controller may also control multiple peripheral devices. A physical access control system, for example, may include many controllers, each controlling physical access to an area of a facility. In such a system, a controller may control, for example, the following peripherals: a credential input device (e.g., a card reader or a keypad), a lock that locks a door, a sensor that senses whether the door is open or closed, and a motor that opens and closes the door. In this example, the controller may receive credentials from the card reader or keypad, and unlock and open the door if the credentials are authenticated.

Operators often encounter difficulties when configuring controllers and peripherals. In some instances, configuring a controller and its peripherals (such as a card reader and door lock) can be so complicated that misconfiguration is easy and yet difficult to detect. For example, a misconfigured lock could potentially be controlled through multiple communication paths and the control logic may not be perfectly aware of the state of the lock, thus believing that a door is locked when in fact the door is not locked. Misconfigured door logic could also correspond to a door that was physically removed and does not exist in the physical world, but still exists in the controller as a logical process awaiting to authenticate a card credentials value (a "ghost door").

In addition, different models of the same type of device (such as two different models of card reader) may use different commands, command formats, or data structures for control, operation, and/or communication. Some devices may even use different voltage levels or current flows to change a state (e.g., different models of lock). For example, take an access control system with a controller, card reader, and lock configured to unlock a door when authentic credentials are presented to the card reader. If the card reader is changed to a different model, the system may stop working and may need to be reconfigured (e.g., to a degree more than one would expect) even though the logical context has not changed and the new card reader is compatible—on a device level—with the remaining controller and lock. The degree of difficulty of reconfiguration increases the chance of misconfiguration and raises the level of expertise needed to reconfigure what would appear to be a minor change.

Configurations in large control systems can become so complex (e.g., in a large corporate campus) that a configuration process can take significant time, during which a communication link may be disrupted or a device may crash. In this case, the configuration may be incomplete, leaving the system state unknown and the operator unaware or frustrated with having to reset devices to a reconfigurable state. Additionally, if the configuration includes an error, some devices may be configured while other devices forgo the configuration because of the error. This may leave the system in an unexpected state until an error-free configuration can be determined and propagated.

These difficulties are exacerbated when the device-specific (or hardware) implementation of the system is not separated from the logical (e.g., context) implementation of the system. In other words, configuration may be more complicated and more challenging when the hardware or device implementation (e.g., model number) of system components is not separated from the logical context (e.g., card reader, door lock) of the system. One or more of the embodiments disclosed below may allow for improved configuration of control systems by separating the logical context from the underlying device implementations. One or more of the embodiments described below may also allow for improved configuration by providing an atomic configuration function, i.e., a configuration function that will either (1) fully and successfully complete or (2) make no change at all (e.g., return to its original state). One or more embodiments described below may also allow for clear "ownership" of control interfaces and/or peripheral devices. Ownership may prevent rogue or misconfigured devices from accessing, controlling, or configuring other resources in a system. Ownership may also enable a resource in a system to be identified and/or removed with its no longer required by the configuration.

Implementations described herein relate to a modular control system (such as a physical access control system) that represents functional elements managed by a controller as resources. In some implementations, the modular system may correspond to a modular physical access control system. In other implementations, the modular system may correspond to a monitoring system, such as a camera system. In yet other implementations, the modular system may correspond to a different type of system, such as an audio generating system.

A resource may enable access to a domain object that corresponds to a modular logical entity that represents a device or port or that corresponds to a modular logical entity that controls another domain object. A domain object may include a set of specifications that define how the domain object functions. For example, a domain object may include one or more interfaces that may be used by the domain object to receive commands or to send notifications. A domain object may be associated with one or more contracts that define how the domain object interacts with other domain object.

A domain object may present one or more resources to a configuration client or to other domain objects. A resource may be associated with a subset of interfaces associated with the domain object. Thus, for example, a first resource associated with the domain object may be associated with a first subset of interfaces to configure the domain object; a second resource associated with the domain object may be associated with a second subset of interfaces to control or use the domain object; a third resource associated with the domain object may be associated with a third subset of interfaces to send notifications to other domain objects, etc.

A domain object, as an example, may correspond to a logical entity that represents a device or port. For example, a peripheral device, such as a credentials reader, may be represented as a credentials reader domain object and made accessible to a configuration client, or to another domain object, as a credentials reader resource. The credentials reader resource may include a set of interface specifications that define how commands are sent to the credentials reader resource and how the credentials reader resource sends notifications of events to another resource.

A domain object, as another example, may correspond to a logical entity that controls another domain object via a resource (referred to as a target resource or as a server resource). For example, a door domain object may be defined that controls a credentials reader domain object, via a credentials reader resource, and that controls a lock domain object, via a lock resource. If the door domain object receives a notification from the credentials reader resource that authorized credentials were received by the credentials reader domain object, the door domain object may instruct the lock resource to unlock. In this example, the credentials reader domain object and/or the lock domain object may be modified or changed without necessarily affecting the functionality of the door domain object.

Furthermore, a resource may correspond to a collection of domain objects or an instance of a domain object. For example, a lock resource collection may include a set of lock resource instances available to a controller. An instruction to control a resource may refer to a resource collection and the controller may select an available domain object instance from the collection, as the operation or control of a resource must be directed to a specific domain object instance. Available resources may be organized into logical groupings of resource collections.

Each domain object may be associated with a domain object handler that includes code that processes operations associated with the domain object. A domain object handler, also referred to as just a handler, may execute code or instructions for domain objects of a particular type. Thus, a domain object handler may process the operations associated with domain object instances of a particular type. For example, a door domain object handler may handle operations for door domain object instances, a lock domain object handler may handle operations for lock domain object instances, a relay domain object handler may handle operations for relay domain object instances, a input/output port domain object handler may handle operations for input/output port domain object instances, etc.

Thus, a modular control system (such as a physical access control system) that represents functional elements (managed by a controller) as resources may improve the problem of compatibility and configuration management. In other words, a modular control system may represent functional relationships between elements as relationships between a client domain object and a target resource presented by a server domain object.

In such a modular system, defining the relationship between the domain objects (e.g., the functional elements managed by a controller) is a technical challenge. For example, if a domain object controls a port resource, the port resource should not necessarily be available to be used by another domain object. Furthermore, a first domain object, should be able to specify how a target resource, corresponding to a second domain object, is to be controlled (e.g., to the exclusion of other resources).

In such a modular system, defining the relationship between the domain objects (e.g., the functional elements managed by a controller) is a technical challenge. For example, if a domain object controls a port, the port should not necessarily be available to be used by another domain object. Furthermore, a resource, corresponding to a first domain object, should be able to specify how a target resource, corresponding to a second domain object, is to be controlled (e.g., to the exclusion of other resources).

Relationships between resources may be established by a configuration client using link selectors. A link selector corresponds to a configuration object included in a first domain object, also referred to as a client domain object, that specifies a target resource presented by a second domain object, also referred to as a server domain object, and that specifies how the target resource is to be controlled (or linked to) by a client domain object. The target resource may be also be referred to as a server resource, as the client domain object may send instructions to the server resource and/or may receive notifications from the server resource. The controller may generate a link between the client domain object and the server domain object based on the link selector if the controller determines that the target resource specified in the link selector can fulfill a request (such as to control the target resource through a particular interface, configure the target resource through a particular interface, and/or view the state of the target resource through a particular interface). Availability may be determined based on a contract associated with the target resource (e.g., the server resource).

A relationship between two domain objects may be established using a contract. A contract may specify the requirements of the relationship between the client domain object and a server resource presented by a server domain object. A contract may specify a client domain object, a server domain object, a type of interface through which the domain objects communicate, an interface through which the domain objects communicate, any notifications the server resource is required to send to the client domain object, and/or an established link via which the server resource and the client domain object communicate. The link may specify a communication path between the server domain object and the client domain object.

A resource (e.g., a server resource) may be able to execute and fulfill numerous contracts. Some contracts may be exclusive such that the server resource can only agree with one other resource (e.g., a client domain object) to execute and fulfill the requirements of the contract. An example of an exclusive contract is a contract to control the operation of the domain object associated with the target resource, such as a lock resource. In this example, only one client domain object (such as a door domain object) should be able to control the lock resource. This exclusivity prevents any other domain object from unlocking the door (and may help prevent misconfiguration). In this case, if a link selector requests that a domain object to be linked to a target resource through an interface for which the target resource already has an exclusive contract with a different client domain object, the link request will be denied and such a configuration will fail.

As stated above, if a link selector is approved and a new contract is generated between two domain objects based on the link selector, a link between the two domain objects may be generated. The implementation may depend on the underlying representation of the domain object and the underlying implementations may exist in various relationships with each other. The underlying representation of a domain object is referred to as a communication endpoint. Communication endpoints may exist in different location relationships with each other and different location relationships may require different message transport mechanisms for efficient communication.

Implementations described herein relate to the registration and management of resources in a modular system. In some implementations, the modular system may correspond to a modular physical access control system. In other implementations, the modular system may correspond to a monitoring system, such as a camera system. In yet other implementations, the modular system may correspond to a different type of system, such as an audio generating system. The controller of a system unit may include collections of resources of different types. Each resource may be included in, and/or presented by, a particular domain object instance that may remain dormant until registered with a domain object handler. A domain object handler may include code for running domain object instances of a particular type of domain object, process messages associated with the domain object instances of the particular type of domain object, maintain state information associated with the domain object instances of the particular type of domain object, execute scripts and/or other types of functions associated with the domain object instance of the particular type of domain object, and/or perform other types of processing associated with the domain object instances of the particular type of domain object. A domain object instance may not become active in the system unit until a configuration client device registers the domain object instance with a domain object handler.

For example, a computer device, acting as a controller for a modular physical access control system, may be configured to generate a collection of resources under a service and expose the collection of resources to the configuration client device when a configuration client accesses the service. The configuration client device may select to register a resource from the collection of resources. Thus, the computer device may be configured to receive, from a configuration client device, a request to register a resource, identify a domain object associated with the resource, wherein the domain object corresponds to a logical entity representing a device or port, or corresponds to a logical entity controlling another resource included in another domain object. For example, the domain object may control a door, a lock, a relay, an input/output port, an access credentials input device, a door actuator, and/or another type of device or port associated with physical access control.

The computer device may be further configured to determine a domain object type associated with the identified domain object, select a domain object handler based on the determined domain object type, register the identified domain object with the selected domain object handler and use the selected domain object handler to process commands, notifications, functions, scripts, states and/or other aspects associated with the registered domain object. For example, the domain object handler may use the information stored in the registered domain object to control a device or port or a target resource associated with another domain object.

The computer device may further assign a process identifier to the registered domain object that is associated with the selected domain object handler. Moreover, the computer device may maintain state information for the registered domain object that indicates a particular state of the device or port associated with the registered domain object, or of the other resource included in the other domain object. The computer device may further define a script for the registered domain object that specifies a particular instruction to be sent to the device or port, or to the other resource, when a particular type of event is detected by the registered domain object. For example, the script may define an access rule that grants or denies access to an area by controlling the device or port or the other resource.

The computer device may be further configured to receiving an update request from the configuration client device for the registered domain object that includes an instruction to add a link selector to the identified domain object and update the registered domain object based on the received update request. For example, the computer device may identify a link selector associated with the registered domain object that specifies how a target resource of another domain object is to be controlled by the registered domain object; generate a contract between the registered domain object and the other domain object, wherein the contract indicates that the registered domain object is to control the target resource of the other domain object and that the target resource is not available to be controlled by other domain objects; and generate a communication path from the registered domain object to the other domain object based on the identified link selector.

FIG. 1 is a block diagram of an exemplary environment 100 in which the systems and/or methods described below may be implemented. As shown in FIG. 1, environment 100 may include a control system 110, a network 120, and an administration device 130.

Control system 110 may include a distributed computing system that includes system units 115-A to 115-N (referred to collectively as "system units 115" or individually as "system unit 115"). System unit 115 may implement a modular control system based on domain objects, which may be presented as resources to clients, as described herein. System unit 115 may be implemented as an embedded system. In some implementations, system unit 115 may include a control device, such as a physical access control device. For example, system unit 115 may include an access controller that controls access to a secured area, such as a room or a group of rooms. System unit 115 may receive credentials (e.g., access card credentials) via a reader device and determine whether the credentials are authentic and are associated with authority to access the secure area. If so, the access controller may issue a command to open a lock on a door or perform other operations associated with granting access to the secure area. In other implementations, system unit 115 may include a different type of security device, such as a monitoring device and/or a device that controls the operation of a machine.

Network 120 enables system units 115 to communicate with each other and/or may enable administration device 130 to communicate with system units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 may include software (e.g., client software) to enable an administrator to connect to a particular system unit 115, configure the system unit 115, change the configuration of the system unit 115, receive information from the system unit 115, subscribe to notifications from the system unit 115, access information stored in the system unit 115, and/or otherwise administer control system 110. Administration device 130 may include any device configured for communicating with a system unit 115. For example, administration device 130 may include a portable communication device (e.g., a mobile phone, a tablet computer, and/or another type of wireless device); a personal computer or workstation; a server device; a laptop computer, and/or any type of computing device with communication capability.

In some implementations, administration device 130 may implement a "thin" client. A thin client may access system unit 115 without having to store any state information associated with system unit 115. For example, a thin client may implement a web page (e.g., JavaScript) that accesses information stored in system unit 115 and displays the information in one or more display objects included in the web page. In other implementations, administration device 130 may implement a "thick" client that stores state information associated with system unit 115. As a thick or thin client, administration device 130 may operate a browser that can access web pages (e.g., including hyper-text markup language and JavaScript) from a particular controller 210.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform the functions described as performed by one or more other devices in environment 100. For example, in some implementations, system units 115 may include an input and/or output device (e.g., keyboard/keypad and display, touchscreen, etc.) and administration device 130 may not be needed.

Figure 2A:
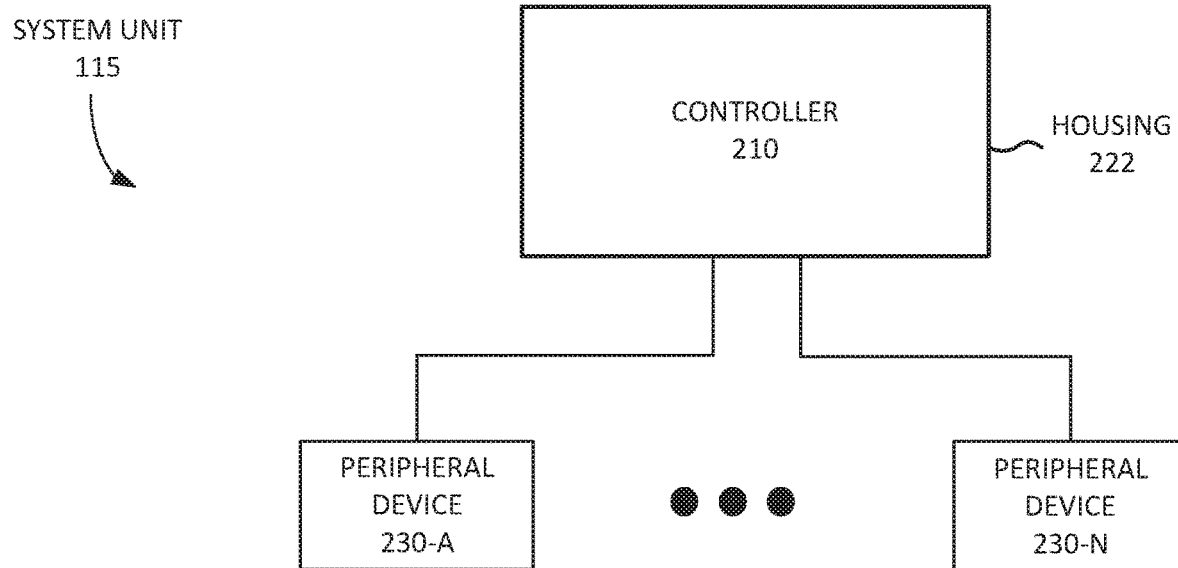
FIG. 2A is a block diagram illustrating exemplary components of a system unit of FIG. 1 in an embodiment.

FIG. 2A is a block diagram illustrating exemplary components of a system unit 115. As shown in FIG. 2A, system unit 115 may include a controller 210 and one or more peripheral devices 230-A to 230-N (referred to herein collectively as "peripheral devices 230" and individually as "peripheral device 230"). Controller 210 may control the operation of system unit 115, may communicate with other system units 115, may communicate with administration device 130, and/or may control peripheral devices 230. Controller 210 may include a computing module, which is described with reference to FIG. 2B.

Peripheral devices 230 may include one or more devices that communicate with controller 210, provide information to controller 210, and/or that are controlled by controller 210. For example, a peripheral device 230 may include a reader device that reads credentials from a user and provides the credentials to controller 210. The reader device may include a keypad configured to receive an alphanumeric personal identification number (PIN) from a user; a card reader to configure a card that stores a card code on a magnetic strip or another type of storage device, such as an RFID tag or NFC chip; a fingerprint reader configured to read a user's fingerprint; an iris reader configured to read a user's iris; a microphone configured to record a user's voice for a voice signature; and/or another type of reader device. The reader device may include any type security device that can provide credentials, and may additionally include one or more sensor devices, such as, for example, a camera used for facial recognition and/or a microphone used for voice recognition.

As another example, a peripheral device 230 may include a lock controlled by controller 210 via, for example, a relay device (e.g., within controller 210). The lock may lock a door (e.g., prevent it from opening or closing), an elevator, a window, an HVAC vent, and/or another type of access opening to a secure area. For example, the lock may include an electromagnetic lock; a mechanical lock with a motor controlled by controller 210; an electromechanical lock; and/or another type of lock. Furthermore, the lock may lock/unlock operation of a machine, transport vehicle, elevator, and/or an electrical device. As another example, a peripheral device 230 may include a relay device that is controlled by controller 210 via a general input/output port. The relay device may control, for example, a door.

As yet another example, peripheral device 230 may include a sensor device. For example, a sensor device may include a door sensor to sense whether a door is open or closed; a visible light monitoring camera, an infrared (IR) light monitoring camera, a heat signature monitoring camera, and/or another type of monitoring device; an alarm sensor, such as a motion sensor, a camera with motion detection software, a heat sensor, a pressure sensor, and/or another type of alarm sensor; an audio recording device (e.g., microphone); a tamper sensor, such as a position sensor located inside system unit 115; and/or a "request to exit" button located within a secured area associated with system unit 115; and/or another type of sensor device.

As another example, peripheral device 230 may include an actuator device. For example, an actuator device may include an illumination device; a burglar alarm activator; a speaker to play messages or generate alarm signals; a display device; a motor to move a sensor device (e.g., control the field of view of a camera or other monitoring device); a motor for opening/closing a door, window, HVAC vent, and/or another opening associated with a secure area; a motor to secure lock device a in a locked or unlocked position; a fire extinguishing device; and/or another type of actuator device.

As yet another example, system unit 115 may correspond to a camera system, with controller 210 corresponding to a controller of the camera unit and peripheral devices 230 corresponding to sub-systems of the camera system. For example, a first peripheral device 230 may correspond to a camera head with a lens system, a second peripheral device 230 may correspond to a pan-tilt-zoom (PZT) motor assembly, a third peripheral device 230 may correspond to a storage device to store an image stream captured by the camera head or to a transceiver device to transmit the image stream to another device, etc.

Housing 222 may enclose the components of controller 210 to protect the components of controller 210 from the environment. In one embodiment, housing 222 may house one or more of peripheral devices 230. In another embodiment, housing 222 may not include peripheral devices 230. In yet another embodiment, housing 222 may include administration device 130. Housing 222 may define the boundaries of one system unit 115 and/or controller 210 from other system units 115 and/or controllers 210 in a multi system unit 115/controller 110 system. Housing 222 may also define the boundaries of controller 210 from one or more peripherals 230.

Figure 2B:
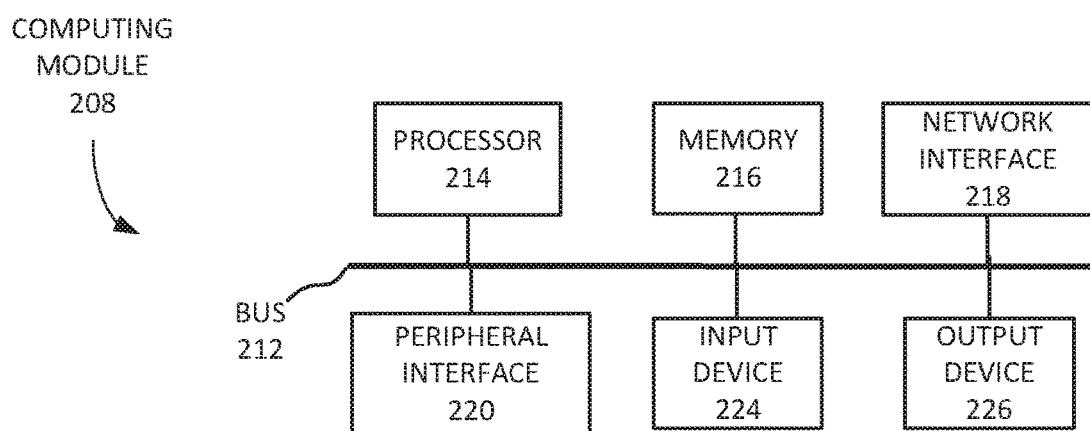
FIG. 2B is a block diagram illustrating exemplary components of a computing module that may be included in a component of FIG. 1 or FIG. 2A.

FIG. 2B is a block diagram illustrating exemplary components of a computing module 208. Controller 210 and/or peripheral device 230 may include one or more computing modules 208. Other computing devices in environment 100, such as administrative device 130, may also include one or more computing modules 208. Computing module 208 may include a bus 212, a processor 214, a memory 216, a network interface 218, a peripheral interface 220, and a housing 222.

Bus 212 includes a path that enables communication among the components of controller 210. Processor 214 may include one or more of any type of single-core processor, multi-core processor, central processing unit (CPU), graphics processing unit (GPU), tensor processing unit (TPU), microprocessor, latch-based processor, and/or processing logic (or families of processors, microprocessors, and/or processing logics) that interprets and executes instructions. Additionally or alternatively, processor 214 may include an application-specific integrated circuit (ASIC), a field-programmable gate array (FPGA), and/or another type of integrated circuit or processing logic.

Memory 216 may include any type of dynamic storage device that may store information and/or instructions, for execution by processor 214, and/or any type of non-volatile storage device that may store information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency (RF), infrared, and/or visual optics, etc.), or a combination of wireless and wired communication links. Network interface 218 may include a transmitter that converts baseband signals to RF signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi, cellular, etc.) card for wireless communications. Network interface 218 may also include a universal serial bus (USB) port for communications over a cable, a Bluetooth wireless interface, a radiofrequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices using Serial Peripheral Interface Bus protocol, such as a Wiegand protocol, an RS-485 protocol, a relay, and/or another type of protocol. As another example, peripheral interface 220 may use a different type of protocol. In one embodiment, network interface 218 may also act as a peripheral interface for coupling peripherals 230 to controller 210.

Some computing modules 208 (e.g., in administration device 130) may also include input device 224 and/or output device 226. Input device 224 may enable a user to input information into computing module 208. Input device 224 may include a keyboard, a mouse, a pen, a microphone, a camera, a touch-screen display, etc. Output device 226 may output information to the user. Output device 226 may include a display, a printer, a speaker, etc. Input device 224 and output device 226 may enable a user to interact with applications (e.g., a web browser) executed by computing module 208. In the case of a "headless" device (e.g., controller 210), input and output is primarily through network interface 218 rather than input device 224 and output device 226.

Controller 210, peripheral device 230 and/or administration device 130 (e.g., each employing a different computing module 208) may perform operations relating to a modular control system, such as selecting links within the modular system, setting up a transport layer within the modular control system, propagating fallback commands within the modular control system, and/or viewing resources within the modular system. Computing module 208 may perform these operations as a result of hardwired circuitry of an ASIC. Additionally or alternatively, computing module 208 may perform these operations in response to processor 214 executing software instructions contained in a computer-readable medium, such as memory 216. A computer-readable medium may include a non-transitory memory device. A non-transitory memory device may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Although FIGS. 2A and 2B show exemplary components of system unit 115 and computing module 208, in other implementations, system unit 115 may include fewer components, different components, additional components, or differently arranged components than depicted in FIG. 2A. Additionally or alternatively, any component of system unit 115 (or any group of components) may perform the task or tasks described as performed by one or more other components of system unit 115. For example, in some implementations, peripheral interface 220 may correspond to a network interface. As another example, in some implementations, peripheral devices 230 may be connected to controller 210 via network interface 218, rather than via peripheral interface 220.

Further, although examples of control system 110 may include a physical access control system, other implementations may control systems other than physical access systems. For example, control system 110 may include a system to control a fan (e.g., start or stop), to initiate an alarm in a building management system (e.g., failed or successful authentication), to control traffic lights, or to control robots in an industrial automation system. As a physical access control system, control system 110 may include any type of physical access control systems (e.g., in different operational environments), such as a control system for opening and/or closing a door, controlling physical access to a building or facility, controlling hotel room doors for hotel guests, and/or controlling elevator floor access.

Figure 3A:
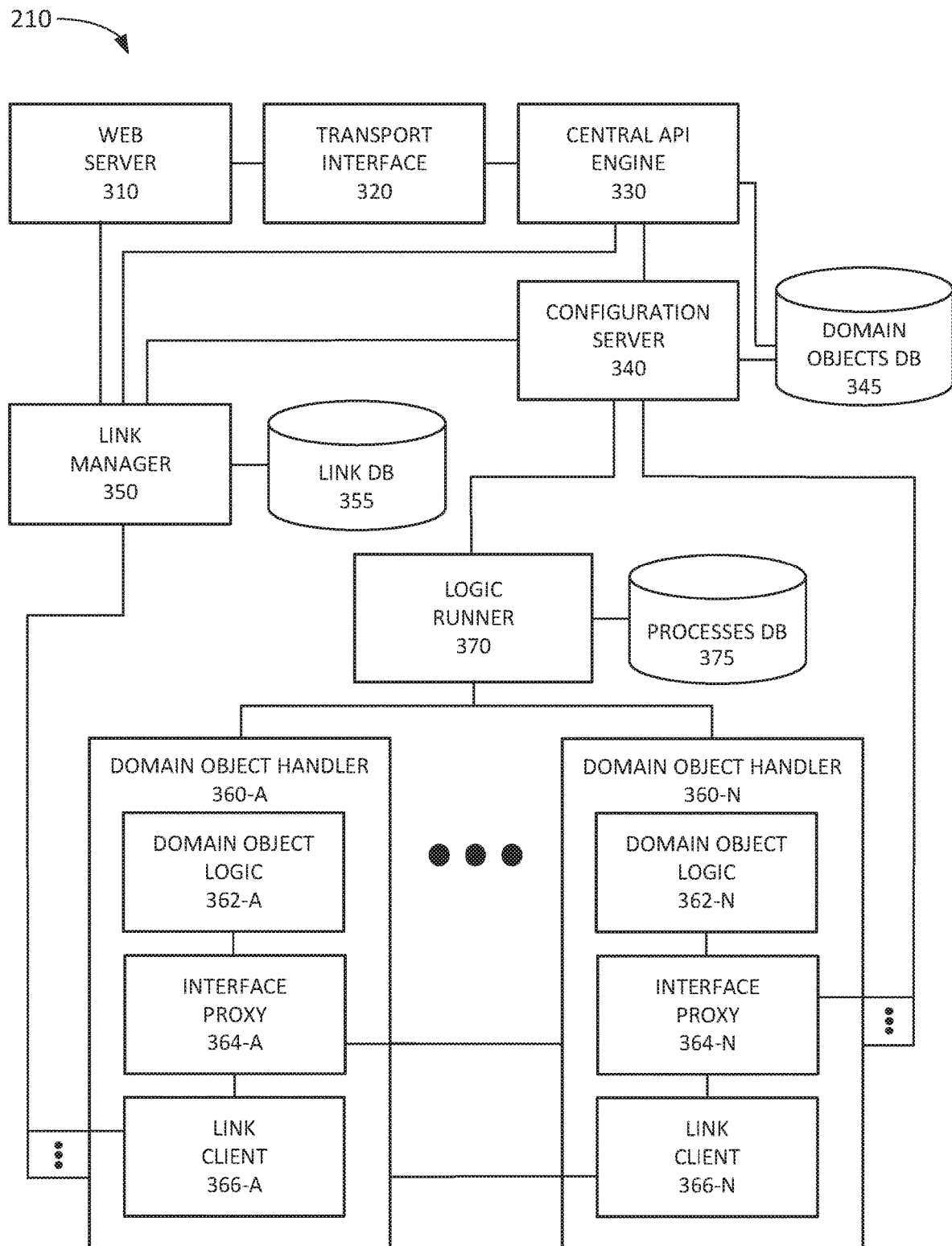
FIG. 3A is a block diagram illustrating exemplary functional components of the controller device of FIG. 2A according to an embodiment.

FIG. 3A is a block diagram illustrating exemplary functional components of controller 210. The functional components of controller 210 shown in FIG. 3A may be implemented, for example, via processor 214 executing instructions from memory 216. Alternatively, or additionally, some or all of the components of controller 210 may be implemented via hard-wired circuitry.

The functional components of controller 210 may implement a modular architecture of a control system. The modular control system may include services and/or resources in which, for example, relationships between resources are abstracted from the underlying implementation of a particular resource. As shown in FIG. 3A, controller 210 may include a web server 310, a transport interface 320, a central API engine 330, a configuration server 340, a domain object DB 345, a link manager 350, a link DB 355, domain object handlers 360-A to 360-N (referred to collectively as "domain object handlers 360" and individually as "domain object handler 360" or more simply "handlers 360" and "handler 360"), a logic runner 370, and/or a processes DB 375.

Web server 310 implements a web server that, in one embodiment, acts as a point of entry into controller 210 for other devices that seek to communicate with controller 210, such as other system units 115, administration device 130, and/or other types of devices. Web server 310 may establish a secure connection with a device that seeks to communicate with controller 210 using, for example, Transport Layer Security (TLS), Hypertext Transfer Protocol (HTTP), HTTP Secure (HTTPS), and/or another protocol. Furthermore, web server 310 may perform authentication, authorization, and accounting (AAA) for incoming traffic and may route authentication and authorized traffic to central API engine 330 and/or to link manager 350. Furthermore, web server 310 may host one or more web applications that enable administration device 130 to interact with controller 210.

Transport interface 320 may convert messages received by web server 310 into a format used by central API engine 330 and convert messages from central API engine 330 into a format used by a client communicating with web server 310. For example, transport interface 320 may convert a Hypertext Transfer Protocol (HTTP) GET request for information into an API call or request that may be processed by central API engine 330 to obtain the information. Transport interface 320 may then convert an API response from central API engine 330 into an HTTP response for the client. As another example, transport interface 320 may convert an HTTP POST request into an API call to configure a particular resource. As yet other examples, transport interface 320 may convert a Representational State Transfer (REST) request into an API call, convert a Remote Procedure Call (RPC) into an API call, convert a web socket call into an API call, and/or may perform a conversion from another type of communication method into an API call to be processed by central API engine 330.

Central API engine 330 processes API requests associated with resources. An API call may create, remove, modify, and/or request information about a resource, for example. Furthermore, an API call may create, delete, or modify a collection of resources. Additionally, central API engine 330 may include a link client 366 (described below) for communicating directly with link clients 366 of resources. When a command needs to be sent to a particular resource, link client 366 of central API engine 330 may send the command to link client 366 of the particular resource.

In creating a resource, central API engine 330 may identify a domain object associated with the resource, select and/or identify one or more interfaces for the resource from a set of interfaces associated with the identified domain object, and/or define one or more communication links to another resource for the resource.

Configuration server 340 may configure a domain object handler based on information stored in domain object DB 345. Domain object DB 345 may store information relating to (e.g., data structures defining) domain objects managed by controller 210. Exemplary information that may be stored in domain object DB 345 is described below with reference to FIG. 4A. Configuration server 340 may control domain object DB 345 and process updates to domain object DB 345. For example, configuration server 340 may process updates received from central API engine 330 relating to the configuration of a domain object handler associated with a domain object that defines a resource. Furthermore, configuration server 340 may update the state of a domain object based on information received from a domain object hander 360 associated with the domain object. For example, a domain object may report a change in a state via an interface using interface proxy 364 and configuration server 340 may update a domain object to record the change in the state.

Furthermore, configuration server 340 may respond to requests for data from central API engine 330. For example, central API engine 330 may request information relating to a first domain object and a second domain object when generating a new contract between the first domain object and the second domain object to determine whether the new contract can be generated. Furthermore, configuration server 340 may report error messages to central API engine 330, such as any failure or error messages reported by a domain object. Central API engine 330 may then report such failures or errors to a user via web server 310, for example. Additionally, configuration server 330 may ensure that resources (e.g., all resources) are associated with a domain object handler 360 and may instruct logic runner 370 to create or select a domain object handler 360 for a particular resource.

Link manager 350 manages communication links between domain object handlers using information stored in link DB 355. A link between a first domain object and a second domain object represents the ability of the code executing on behalf of the first and second domain objects (e.g., domain object handlers) to communicate with each other. As such, the link manager 350 may associate a link specified in domain objects with an implementation of that link, which defines a communication path between the first domain object handler and the second domain object handler. Link manager 350 may receive a request from configuration server 340 to implement a link between a first domain object handler and a second domain object handler based on a contract between the first domain object and the second domain object. Link manager 350 may make determinations regarding how to implement the link as a communication path, such as whether the first domain object handler and the second domain object handler are associated with the same process and/or are implemented on the same device.

If the first domain object handler and the second domain object handler are associated with the same process ID, link manager 350 may identify a memory buffer used by the first domain object handler and the second domain object handler to communicate with each other. If the first domain object handler and the second domain object handler are associated with different process IDs in the same device, link manager 350 may select an inter-process communication mechanism to be used by the first domain object handler and the second domain object handler to communicate with each other. For example, in some implementations, link manager 350 may generate an inter-process socket (e.g., a Linux domain socket), connect the generated socket to the second domain object handler, and instruct the first domain object handler to send and receive data to and from the second domain object handler using the generated socket. In other implementations, link manager 350 may select a different type of inter-process communication, such as a pipe, a software bus, or a storage file to be used by the first domain object and the second domain object to communicate with each other.

If the first domain object handler and the second domain object handler are associated with different devices (e.g., the first domain object handler is associated with system unit 115-A and the second domain object handler is associated with system unit 115-B), link manager 350 may identify the other device associated with the second domain object handler and then generate a communication path to the other device.

As another example, link manager 350 may identify the other device based on information included in the link selector associated with the link. For example, the link selector in the first domain object may include a device ID associated with the other device that includes the second domain object. As an example, the second domain object may be identified in the link selector by a Uniform Resource Identifier (URI) that includes a path name that identifies the other device and the second resource. As yet another example, link manager 350 may, when generating a communication path for a link, query other devices in control system 110 to determine which device is associated with the domain object handler associated with the second domain object. For example, link manager 350 may send a message to the other devices with a resource ID for the second resource, requesting a response from a particular system unit 115 identifying whether the domain object associated with the second resource is included in the domain object DB 345 of the particular system unit 115.

After the other device is identified, link manager 350 may establish a secure communication path to link manager 350 located in the other device. For example, the two link managers 350 from the two devices may exchange information (such as network addresses and/or ports) to establish a socket between the two domain objects on different devices. Additionally, or alternatively, the two link managers 350 may perform a TLS handshake to exchange key information for encrypted communication. Link manager 350 may store information associated with an implemented link in link DB 355. Link manager 350 may also send the information associated with an implemented link to link client 366 associated with the end-point resources (e.g., link client 366-A and link client 366-B). In this way, the communication path does not necessarily pass through link manager 350 (thus avoiding a bottleneck) and domain objects may communicate with each other (via respective link clients 366). Thus, link manager 350 configures links between domain object handlers and link clients 366 of the resources send and receive messages via the configured link.

Domain object handler 360, also referred to as a handler 360, may handle domain objects (e.g., domain objects of a particular type). Handler 360 may execute code to provide resources in a service through interfaces exposed by handler 360 (e.g., as defined in a domain object). In one embodiment, each different type of domain object may be managed by a different domain object handler 360. As an example, if system unit 115 controls two different types of locks (e.g., each being a peripheral 230 to a controller 210), system unit 115 may run two different domain object handlers 360, a first domain object handler 360 for domain object instances associated with the first type of lock and a second domain object handler 360 for domain object instances associated with the second type of lock. As another example, a first domain object handler 360 may execute code associated with a first type of door (e.g., a swing door), and a second domain object handler 360 may execute code associated with a second type of door (e.g., a sliding door).

A domain object instance of a particular type may be defined in a domain object data structure stored in domain object DB 345 and code/instructions associated with the operation or functioning of domain object instances of the particular type may be handled by a particular domain object handler 360 configured for the particular type of domain object instances. Domain object handler 360 may include a domain object logic 362, an interface proxy 364, and a link client 366.

Domain object logic 362 may include logic to implement functions and/or process instructions associated with domain object instances of a particular type of domain object. For example, domain object logic 362 may identify a particular port, one or more pins of an input/output port and/or a particular device (e.g., a relay controlling a lock). Furthermore, domain object logic 362 may include a device driver for a particular peripheral device 230, a set of instructions to control the particular peripheral device 230, one or more libraries of functions associated with the particular domain object, and/or other types of logic and/or instructions to implement the particular domain object.

Interface proxy 364 may implement one or more interfaces associated with the particular domain object and/or type of domain object. As an example, configuration server 340 may send instructions to a handler associated with an instance of a domain object type via interface proxy 364 using a particular interface. As another example, configuration server 340 may receive a notification and/or may request a piece of information about the domain object instance (e.g., through the associated handler) via interface proxy 364 using a particular interface.

Link client 366 may interface with and (in some instances) be configured by link manager 350. For example, link client 366 may receive information about an implementation of a link that defines a communication path between it and another link client 366 associated with another domain object. Link client 366 may use this information to send and/or receive messages through the communication path to/from the other domain object (e.g., via the associated handler). The destination domain object may be located in the same device or in a different device. If the destination is located in the same device, link client 366 may forward the message to a link client 366 associated with the second domain object (e.g., by using a memory buffer or an inter-process socket). If the destination domain object handler is located on a different device (e.g., another system unit 115 or administration device 130), link client 366 may pass the message through web server 310. Similarly, link client 366 may receive a message from a domain object on another device via web server 310.

In one embodiment, link manager 350 may act as a go-between, intermediary, or proxy between two domain objects. In this embodiment, a link client 366 may send a message to another domain object handler via link manager 350 or may receive a message from another domain object handler via link manager 350. In this embodiment, link manager 350 may route messages between domain object handlers based on information stored in link DB 355. As an example, link manager 350 may receive a message from a first domain object handler, associated with a first domain object and destined for a second domain object, identify an implementation of the link between the first domain object handler and the second domain object handler based on information stored in link DB 355, and forward the message to a destination associated with the second domain object handler.

Logic runner 370 may run processes in controller 210. A particular process may execute domain object handler 360 associated with domain object instances of a particular type. Particular domain objects may be associated with particular processes via an identifier referred to as a slot. Each process may be associated with a priority and processes with a higher priority may be assigned more processor time. A particular domain object may be linked to a particular process via a slot. A particular process may execute resources (e.g., activated resources) that are deployed and running in a control system. Information relating to processes managed by logic runner 370 may be stored in processes DB 375.

Although FIG. 3A shows exemplary functional components of controller 210, in other implementations, controller 210 may include fewer functional components, different functional components, differently arranged functional components, or additional functional components than depicted in FIG. 3A. Additionally, any one of the components (or any group of components) of controller 210 may perform functions described as performed by one or more other functional components of controller 210.

Figure 3B:
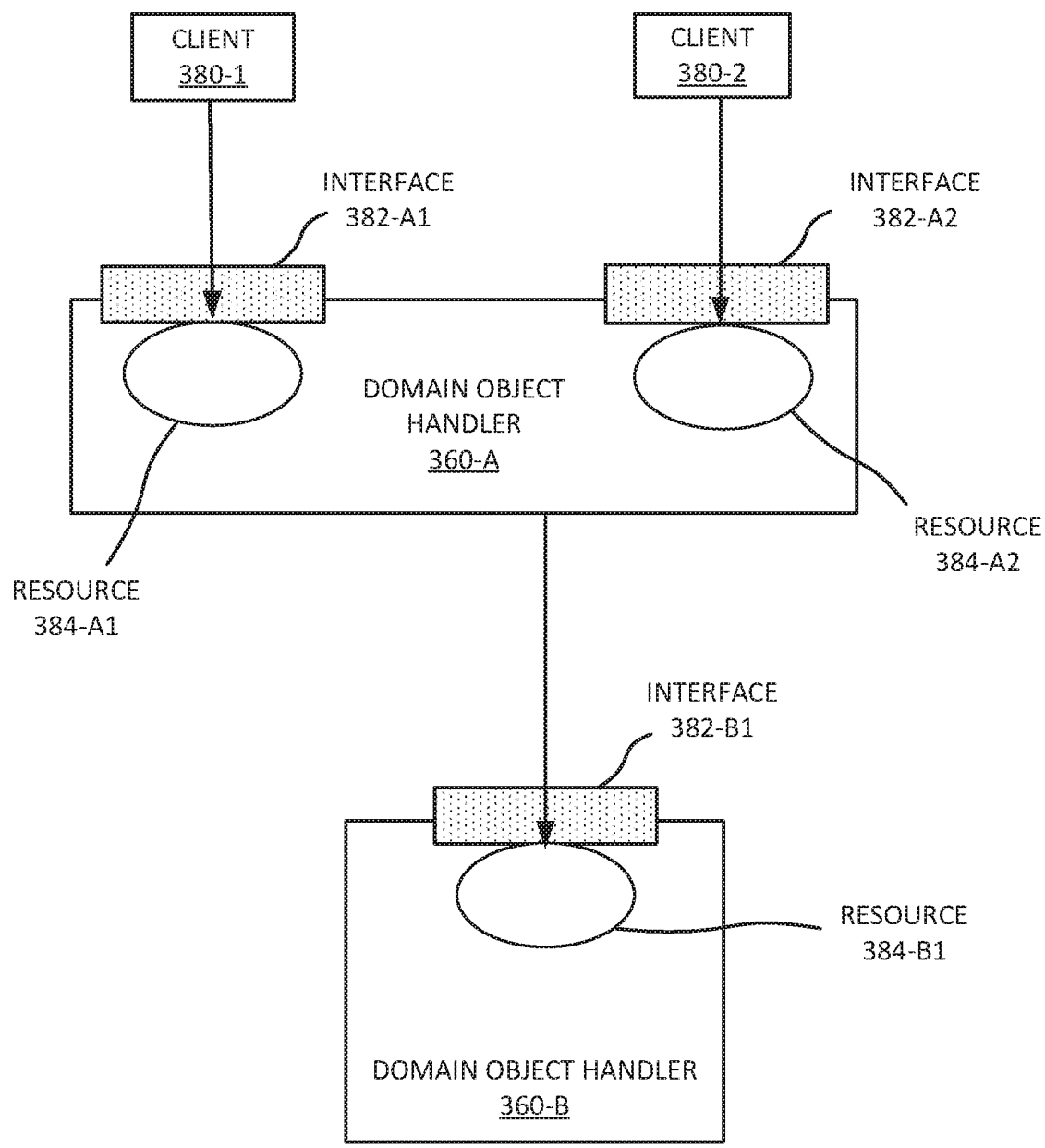
FIG. 3B is a diagram illustrating an exemplary configuration of domain object handlers according to an embodiment.

FIG. 3B illustrates an exemplary configuration 377 of domain object handlers 360 (or more simply "handlers 360" if plural or "handler 360" if singular), clients 380, interfaces 382, and resources 384 in one embodiment. Configuration 377 includes two clients: client 380-1 and client 380-2. Clients 380 may represent external client software (e.g., hosted by administration device 130) and/or an internal client (e.g., another domain object handler 360). Configuration 377 also has two domain object handlers 360: a first handler 360-A and a second handler 360-B.

First handler 360-A provides a service that includes two resources: resource 384-A1 and resource 384-A2. First handler 360-A also exposes two interfaces 382, provided by the service, for the two resources: first interface 382-A1 for resource 384-A1, and second interface 382-A2 for resource 384-A2.

Second handler 360-B provides a service that includes one resource 384: resource 384-B1. Second handler 360-B exposes one interface 382, provided by the service, for the resource: an interface 382-B1 for resource 384-B1. Second handler 360-B acts as a server to provide resource 384-B1 of a service to its client (e.g., first handler 360-A).

Figure 4A:
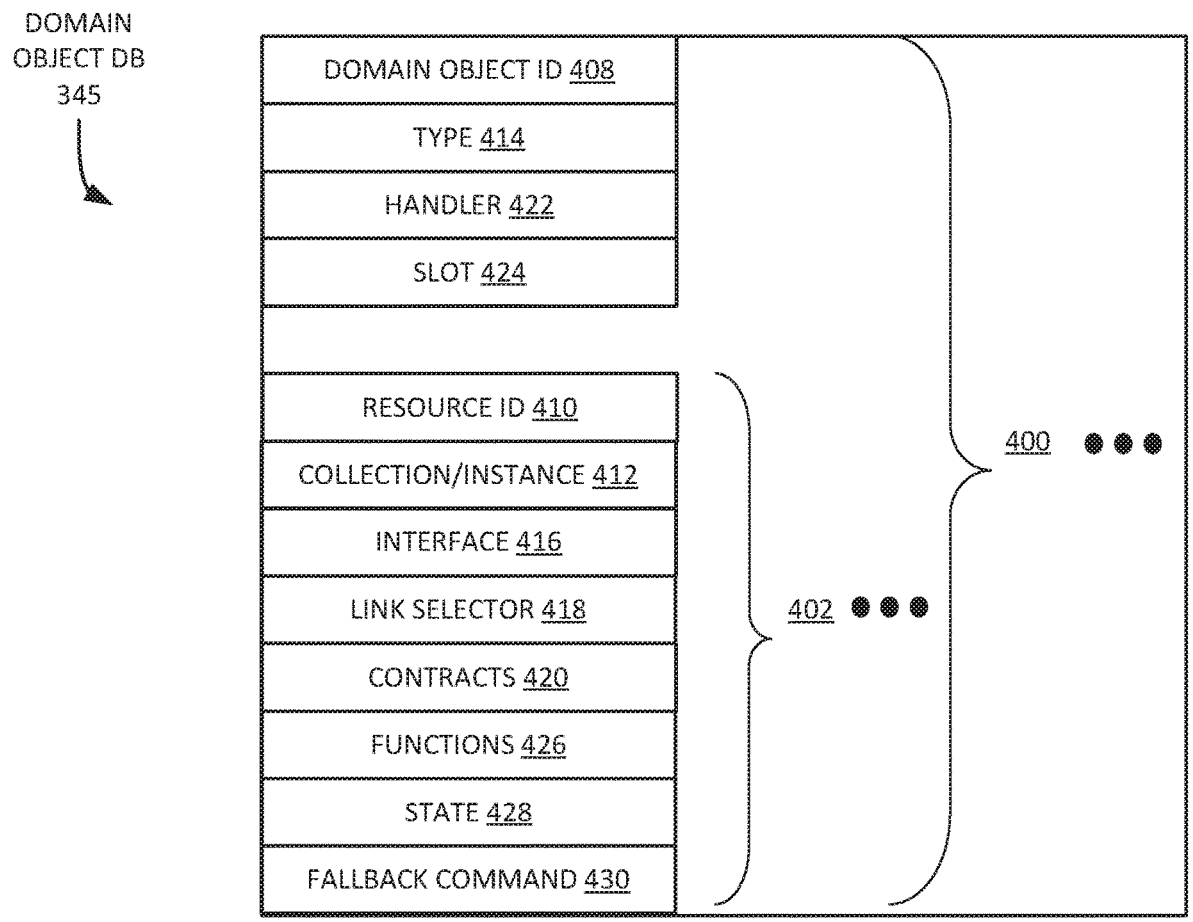
FIG. 4A is a diagram illustrating exemplary information that may be stored in the resource database of FIG. 3 according to one embodiment.

FIG. 4A illustrates exemplary information (e.g., data structure(s) and/or records) that may be stored in domain objects DB 345. As shown in FIG. 4A, domain objects DB 345 may include one or more domain objects 400 (referred to in the singular as "domain object 400"). Domain object 400 may store information relating to a domain object handler, such as the services provided by the handler, the interfaces exposed by the handler, and/or resources that correspond to the interfaces.

Domain object 400 may include a domain object identifier (ID) field 408, a type field 414, a handler field 422 (or domain object handler field 422), and/or a slot field 424. Domain object 400 may also include one or more resource records 402 (referred to in the singular as "resource record 402"). Resource record 402 may correspond to a resource provided by a domain object handler as part of a service. Some or all of the fields described as being in resource record 402 may be included in domain object 400, such as state field 428.

Domain object ID field 408 may store an identifier associated with domain object 400. The domain object identifier may be generated when the corresponding domain object is created and may be unique to the domain object. The identifier may be a universally unique identifier (UUID) for the domain object.

Type field 414 may store information identifying a type of domain object for domain object 400. For example, the type may specify a type of device or port associated with the particular domain object, a type of logical entity (e.g., a type of door or another type of portal, such as a window, elevator door, HVA vent, etc.), a make and/or model for a type of device, a software version associated with a device or device driver, and/or other information that may specify a type of domain object. Handler field 422 may store information identifying domain object handler 360 associated with the resource and/or domain object.

Slot field 424 may store information identifying a slot associated with the particular domain object 400. A slot may correspond to a process ID that associates the particular domain object to a particular process managed by logic runner 370. Thus, the slot may associate the particular domain object to a process ID (PID) running on controller 210.

As noted, a domain object 400 may include one or more resource records 402. Resource record 402 may include a resource ID field 410, a collection/instance field 412, an interface field 416, a link selector field 418, a contracts field 420, a function field 426, a state field 428, and/or a fallback command field 430.

Resource ID field 410 may store an identifier associated with the corresponding resource. The identifier may be generated when the resource is created and may be unique to the resource. In one implementation, the resource identifier field may include a path name based on the resource location in the resource tree (e.g., portal/door/1) and/or may also be associated with a universally unique identifier (UUID). Collection/instance field 412 may store information identifying whether the particular domain object corresponds to a resource collection or to a resource instance.

Interface field 416 may store information relating to one or more interfaces associated with the resource. A domain object may be associated with many interfaces, and each resource associated with the domain object may be associated with a subset of those interfaces. Interface field 416 may also identify a schema for the interface. The schema may specify the format for the interface, such as the required fields and data types for each field. Furthermore, interface field 416 may identify one or more commands that may be sent to the particular resource using the interface. Moreover, interface field 416 may identify one or more notifications that may be generated by the domain object using the interface.

Link selector field 418 may store one or more link selectors associated with the resource and/or domain object. Exemplary information that may be stored in link selector field 418 is described below with reference to FIG. 4B.

Contracts field 420 may store information relating to one or more contracts associated with the resource. A contract may identify the entity (e.g., another resource or handler) that is authorized to use a particular interface of another resource or handler. In this way, the interface may be used (e.g., exclusively) by the authorized entity, for example. A contract may identify a client domain object, a server domain object, an interface associated with the contract, a link between the client domain object and the server domain object, and any notifications (e.g., a subscription to a notification) that may be sent by the server domain object to the client domain object as part of the contract. In some implementations, an executed contract may have two parts: one for each party to the contract and each party may be associated with one of the parts. In some implementations, the contract may also include a field that specifies whether the contract is an exclusive type or not an exclusive type.

Function field 426 may store information relating to one or more functions to be performed by the handler corresponding to the resource. For example, function field 426 may store a function for the handler to interpret a fallback command (e.g., stored in fallback command field 430) to generate another fallback command for another (e.g., server) resource to execute should communication between the domain object and the server resource fail. As another example, function field 426 may store a function for the handler to generate a command for another resource linked to by the handler. The function may generate the command in response to a detected condition (e.g., a broken communication path), to generate a notification for a client or another resource, or may include another type of function. Examples of such functions may include applying one or more access rules to a credentials value, maintaining a particular state for a particular period of time (e.g., a maximum time period a lock is allowed to be in an unlocked state), sending a notification message in response to detecting an event, storing information associated with an event, etc. In some implementations, a function may be defined using a script.

State field 428 may store information relating to one or more states associated with the particular resource. For example, state field 428 may store information identifying whether the particular resource has been activated. Moreover, state field 428 may store information relating to one or more functional states associated with a resource, such as, for example, whether the resource is operational, any error states associated with the resource, what state the resource is currently in (e.g., is a lock locked or unlocked, is a door open or closed, how many people are in a room, is a port sending or receiving data, is an indicator light on or off etc.).

Fallback command field 430 may specify a command that the associated handler should execute if the domain object handler 360 is no longer in communication with the client domain object handler 360 (e.g., through the interface specified in interface field 416). The fallback command recorded in fallback command field 430 may be received during a configuration process or operational process, for example, through an interface associated with configuration.

As mentioned above, some domain objects 400 may store information relating to resource instances and other domain objects 400 may store information relating to resource collections (e.g., a collection of resources of a particular type). A resource associated with a collection of resources may be referred to as a service associated with that collection of resources. For example, a "configuration" or "installation" service may provide a resource for configuring other resources. Each service may be associated with its own domain object handler 360. Thus, each service may correspond to a particular domain object type.

Although FIG. 4A show exemplary components that may be stored in domain objects DB 345, in other implementations, domain objects DB 345 may include fewer components, different components, differently arranged components, or additional components than depicted in FIG. 4A.

Figure 4B:
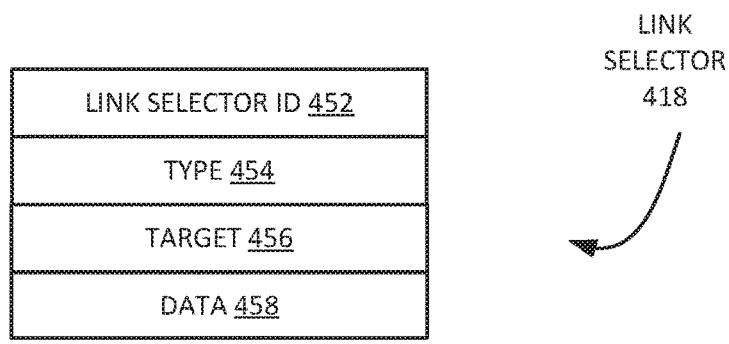
FIG. 4B is a diagram illustrating exemplary information that may be stored in a link selector field of FIG. 4A according to one embodiment.

FIG. 4B is a diagram illustrating exemplary information that may be stored in link selector field 418. As shown in FIG. 4B, link selector field 418 may include a link selector ID field 452, a type field 454, a target field 456, and a data field 458.

Link selector ID field 452 may store an identifier associated with a particular link selector. The identifier may be generated when the corresponding link selector field is created and may be unique to the link. The identifier may be a universally unique identifier (UUID) for the link selector.

Type field 454 may identify a type associated with the particular link selector. A link selector may correspond to a "use," "configuration," or "private" type. A "use" type may indicate that the client domain object is configured to use the target resource without configuring the server resource. A "configuration" type may indicate that the client domain object is configured to use the target resource and to change the configuration of the target resource. A "private" type link selector may indicate that the target resource is created by the link selector for the exclusive use of the client domain object.

Target field 456 may identify the target resource associated with the particular link selector. The target resource may correspond to the server resource included in the server domain object and the domain object that includes the particular link selector may correspond to the client domain object that uses/controls the server or target resource.

Data field 458 may include configuration data associated with the particular link selector. For example, the configuration data may configure the target resource into a particular state, instruct the target resource to provide a particular type of notification to the client domain object, and/or other types of configuration instructions.

Although FIG. 4B shows exemplary components that may be stored in link selector field 418, in other implementations, link selector field 418 may include fewer components, different components, differently arranged components, or additional components than depicted in FIG. 4B.

Figure 5A:
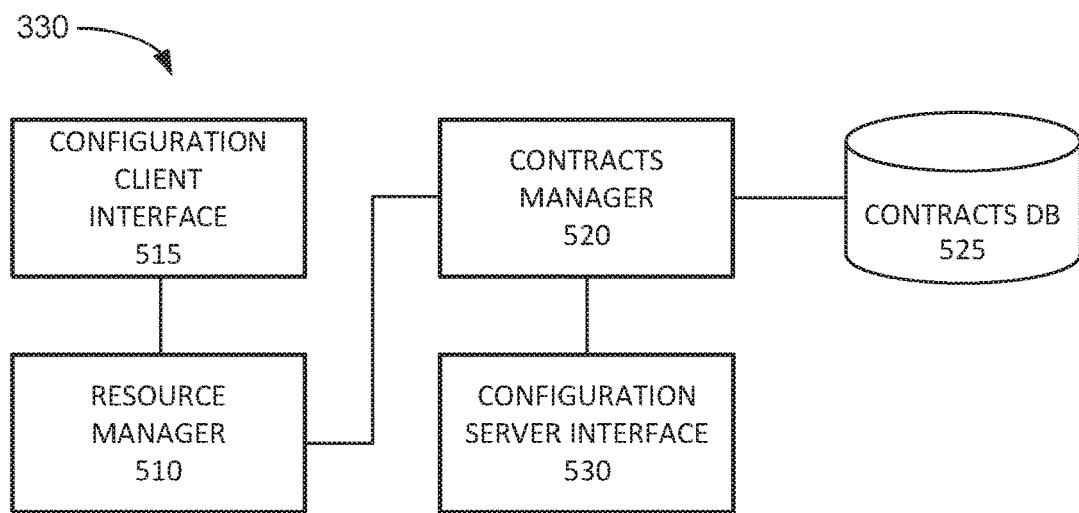
FIG. 5A is a diagram illustrating exemplary functional components of the central application programming interface engine of FIG. 3A according to one embodiment.

FIG. 5A is a diagram illustrating exemplary functional components of central API engine 330. The functional components of central API engine 330 shown in FIG. 5A may be implemented, for example, via processor 214 executing instructions from memory 216. Alternatively, some or all of the components of central API engine 330 may be implemented via hard-wired circuitry. As shown in FIG. 5A, central API engine 330 may include a resource manager 510, a configuration client interface 515, a contracts manager 520, a contract DB 525, and a configuration server interface 530.

Resource manager 510 may manage resources, domain objects, and domain object handlers associated with controller 210. For example, resource manager 510 may detect link selectors in a resource record 402 using a link selector detector. The link selector detector may access a resource record 402 when a new resource is modified and detect a link selector based on a particular link selector field identifier.

Resource manager 510 may perform CRUD operations on resources by instructing configuration server 340 to update domain objects DB 345. Resource manager 510 may receive CRUD requests via, for example, configuration client interface 5150. Configuration client interface 515 may interface with a configuration client in administration device 130, another system unit 115, and/or another type of device. In one embodiment, the configuration client may include a thin client that does not store state information associated with system 115, such as a web interface. Alternatively, the configuration client may implement a "thick" client that stores state information associated with system unit 115.

Contracts manager 520 may monitor contracts associated with a resource and may store information relating to resource contracts in contract DB 525. Exemplary information that may be stored in contract DB 525 is described below with reference to FIG. 5B. Contracts manager 525 may identify contracts associated with a resource based on, for example, contracts field 420 of resource record 402 associated with a domain object. Contracts manager 520 may detect a link selector in a resource record 402 associated with a domain object, based on, for example, a link selector field identifier. Contracts manager 520 may then determine, based on the contracts associated with an interface of a target resource specified in a link selector, whether the target resource is available to form a contract with the client domain object that includes the link selector. If the target resource is not available and the link selector cannot be implemented, contracts manager 520 may generate an error message and send the error message to administration device 130, indicating that a link selector associated with the client domain object cannot be realized. If the target resource is available to form a contract based on the identified link selector, contracts manager 520 may generate a contract between the client domain object that includes the link selector and the server resource specified as the target resource in the link selector. Contracts manager 520 may store information relating to the generated contract in contract DB 525 and/or in resource records 402 associated with the client domain object and the server resource.

Configuration server interface 530 may interface with configuration server 340. For example, configuration server interface 530 may send instructions to configuration server 340 to update a particular resource record 402 in domain objects DB 345 based on a CRUD request received, and approved, by central API engine 330. Configuration server interface 530 may instruct link manager 350 to implement a link based on a detected link selector, if contracts manager 520 generates a new contract based on a link selector and resource manager 510 selects to implement a link based on the link selector and contract. After generating a link, link manager 350 may provide information relating to the generated link to contracts manager 520 via configuration server interface 530. Configuration server interface 530 may instruct link manager 350 to implement a link based on the detected link selector, if contracts manager 520 generates a new contract based on a link selector. After generating a link, link manager 350 may provide information relating to the generated link to contracts manager 520.

Although FIG. 5A shows exemplary functional components of central API engine 330, in other implementations, central API engine 330 may include fewer functional components, different functional components, differently arranged functional components, or additional functional components than depicted in FIG. 5A. Additionally, any one of the components (or any group of components) of central API engine 330 may perform functions described as performed by one or more other functional components of central API engine 330.

Figure 5B:
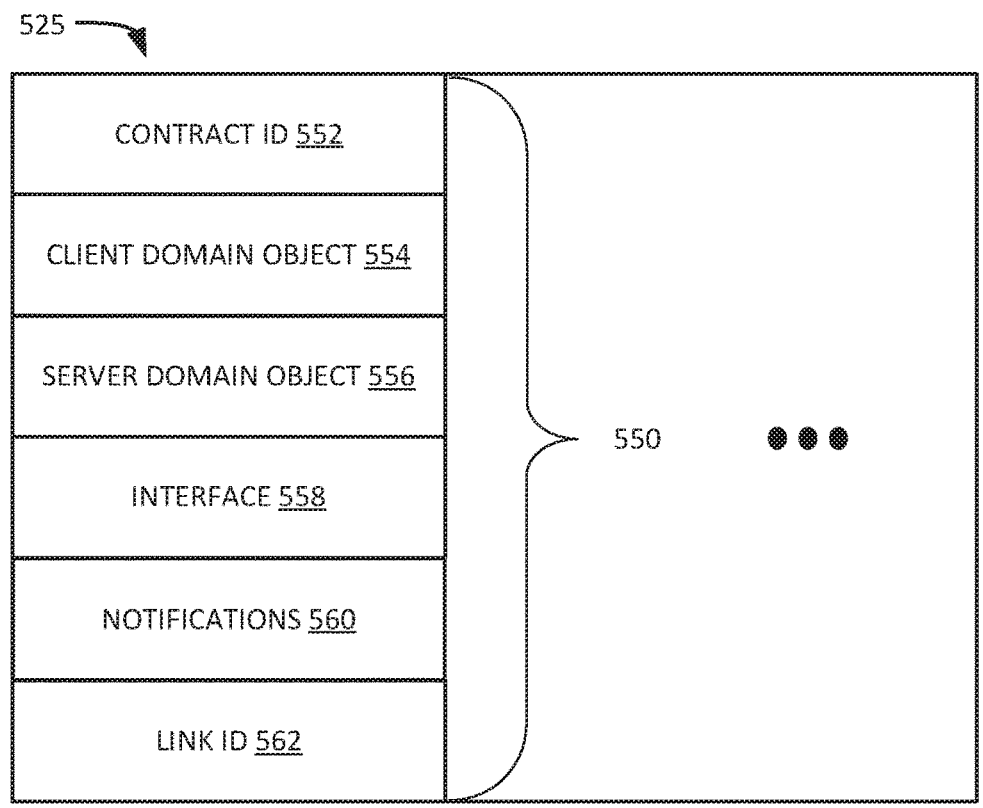
FIG. 5B is a diagram illustrating exemplary information that may be stored in the contracts database of FIG. 5A according to one embodiment.

FIG. 5B is a diagram illustrating exemplary information that may be stored in contract DB 530. As shown in FIG. 5B, contract DB 530 may include one or more contract records 550. Each contract record 550 may store information relating to a particular contract between two resources. In one embodiment, a contract may have two parts (e.g., two contract records 550): one for each party to the contract and each party may be associated with one of the parts. Contract record 550 may include a contract ID field 552, a client domain object field 554, a server domain object field 556, an interface field 558, a notifications field 560, and a link ID field 562. In one embodiment, contract record 550 may also include a field that specifies whether the contract is an exclusive type or a non-exclusive type.

Contract ID field 552 may include an identifier that identifies a particular contract. If the contract has been executed, then each of the two parts of the contract may be associated with the same identifier in contract ID field 552, for example. The contract ID may be generated when the contract is executed and may be unique (e.g., a UUID).

Client domain object ID field 554 and server domain object ID field 556 together may identify the parties (e.g., the resources) to corresponding contract. Client domain object ID field 554 may identify the client domain object ID associated with the particular contract (e.g., as stored in the corresponding resource ID field 408). Server domain object ID field 556 may identify the server domain object ID associated with the particular contract (e.g., as stored in the corresponding resource ID field 408).

Interface field 558 may identify an interface (or a type of interface) associated with the contract. Interface field 558 may identify the interface by reference to an API in interface field 416 of resource record 402 associated with the server domain object identified in server domain object ID field 556. When central API engine 330 determines whether a resource can fulfill a contract, central API engine 330 may determine whether the interface specified in interface field 558 is capable of fulfilling the interface requested by the client domain object.

Notifications field 560 may store information relating to any notifications that are to be sent from the server domain object to the client domain object. For example, the client domain object may subscribe to notifications relating to a particular event associated with the server domain object. Link ID field 562 may identify a link established by link manager 350 between the client domain object and the server domain object.

Although FIG. 5B show exemplary components that may be stored in contract DB 525, in other implementations, contract DB 525 may include fewer components, different components, differently arranged components, or additional components than depicted in FIG. 5B. For example, client domain objectID field 554 and server domain object ID field 556 may be labeled first-party ID field and second-party ID field. As another example, contract DB 525 may include an executed field that includes a Boolean value indicating whether the contract has been executed (e.g., agreed upon by the two parties).

Figure 6A:
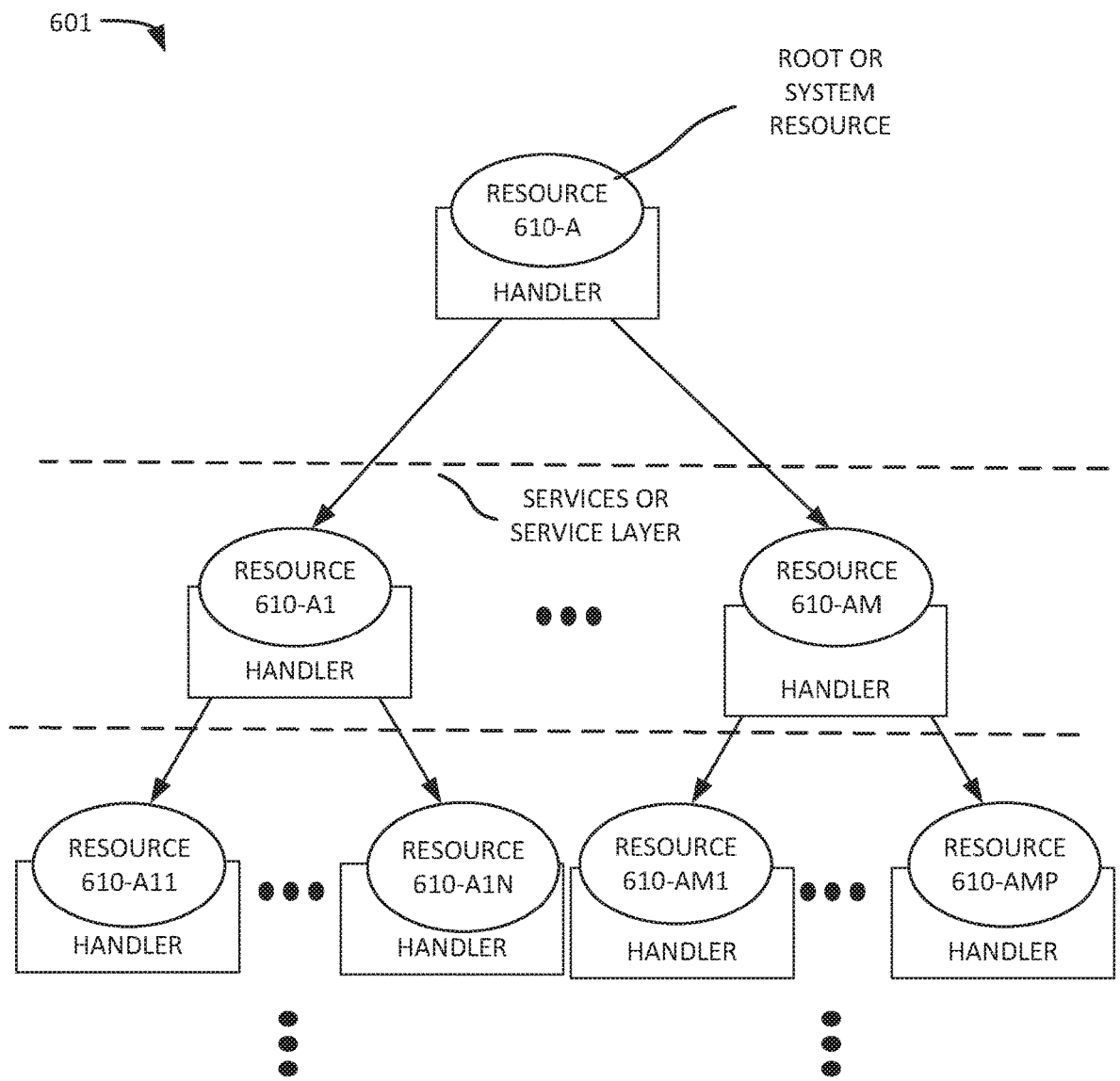
FIG. 6A is a diagram illustrating an exemplary view of resources managed by controller device according to an embodiment.

FIG. 6A is a diagram illustrating an exemplary view 601 of resources managed by controller device 210 (e.g., as perceived by an external client such as administration device 130). View 601 is similar to configuration 377 (FIG. 3B) but with the omission of interfaces for simplicity and ease of understanding. View 601 shows resources 610 in a hierarchical tree in which the corresponding domain object handler 360 (each referred to as "handler" for simplicity in FIG. 6A) may include one or more links to one or more other resources (e.g., through interfaces which are not shown). For example, the handler of a root resource 610-A links to each of resources 610-A1 to 610-AM, the handler of resource 610-A1 links to each of resources 610-A11 to 610-A1N, the handler of resource 610-AM links to each of resources 610-AM1 to 610-AMP (e.g., where M, N, and P are integers), and so on. As noted above, each link from a handler to a resource passes through an interface (not shown). Each link may also be generated based on a link selector and may identify the resource as the target resource of the link selector. In some instances, a handler may not link to any resources.

Resources may be addressed by a handle or pointer. For example, the handle or pointer to resource 610-AMP may be written as resource_610-A/resource_610-AM/resource_610-AMP. The top resource may be referred to as the root or system resource and may be omitted from the handle or pointer for convenience.

As discussed, a resource is provided by the service of a domain object handler 360. In some cases, a single domain object handler 360 may provide the services of multiple resources. A domain object handler 360 may act as a client and request the services of a resource provided by another domain object handler (acting as a server) through an interface.

Figure 6B:
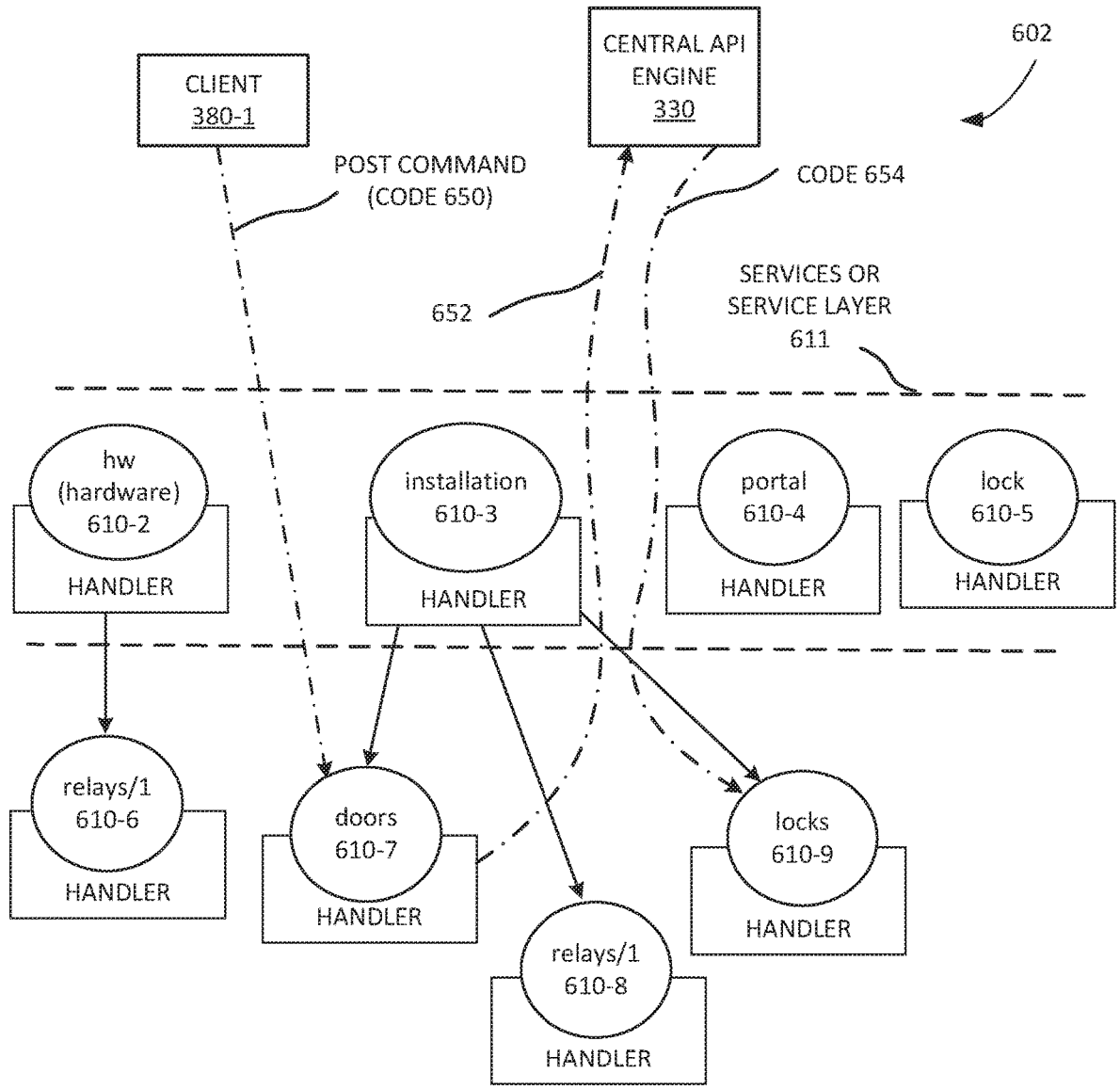
FIG. 6B is a diagram of an exemplary view of resources in a control system for a door with a lock employing a relay according to an embodiment.

FIG. 6B is a diagram of an exemplary view 602 of resources in a control system for a door with a lock employing a relay. View 602 omits the root or system resource for ease of understanding. View 602 may be, for example, how resources are presented (e.g., logically and/or graphically) to a software client in administration device 130 for an administrator to understand and configure the control system. Resources 610 shown in FIG. 6B included in service layer 611 are: hw (or "hardware") service 610-2, installation service 610-3, portal service 610-4, and locks service 610-5. Other resources 610 may include hardware/relays/1 610-6, installation/doors 610-7, installation/relays/1 610-8, and installation/locks 610-9. These resources 610 may also be expressed as resource relays/1 610-6 in the hardware service 610-2, for example.

Figure 6D:
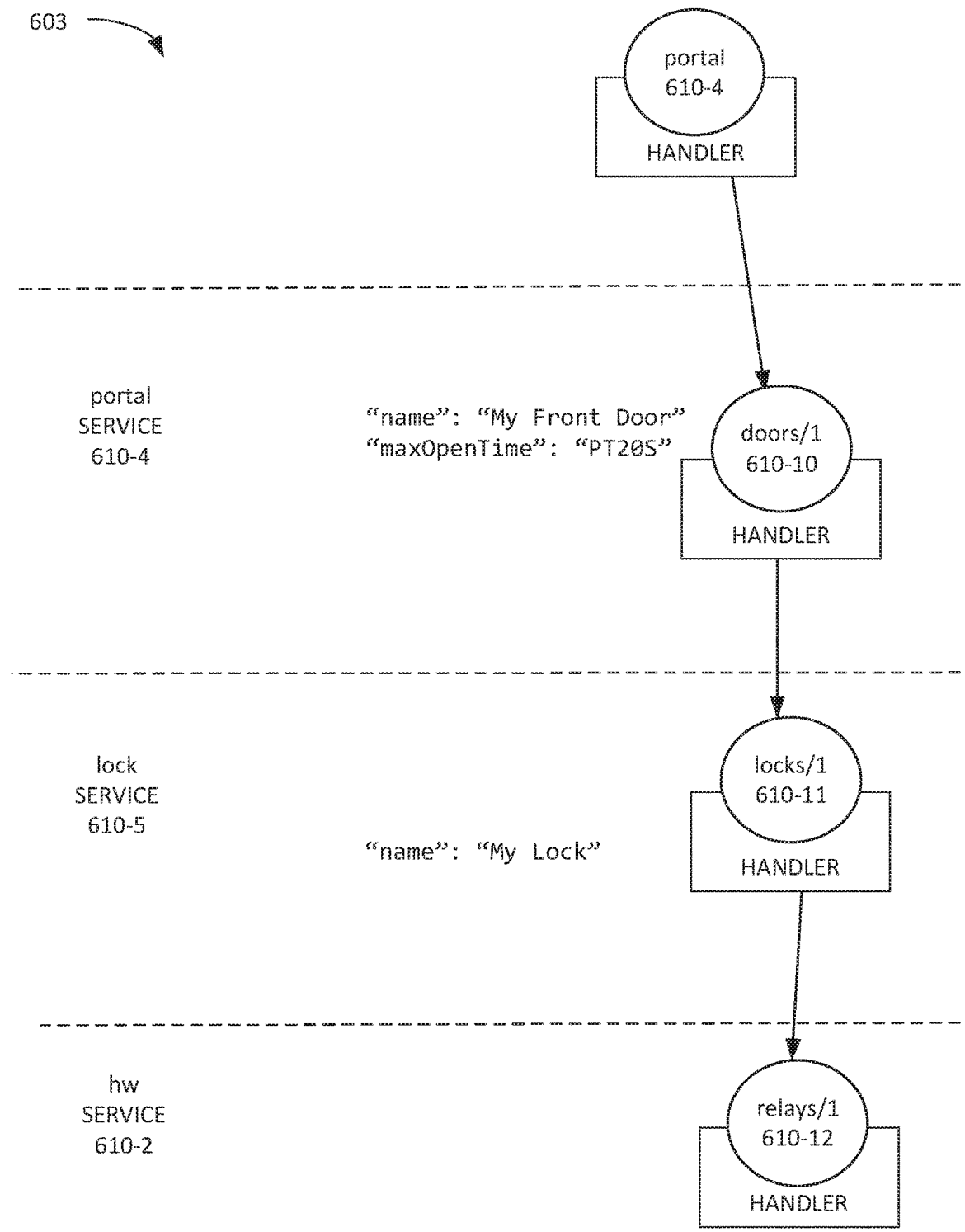
FIG. 6D is a diagram of the resources of FIG. 6B configured based on the code of FIG. 6C according to an embodiment.

Resources 610 may be created, removed, and/or configured by clients (e.g., client software in administration device 130 and/or handlers). FIG. 6C includes an example of code 650 to configure resources from the configuration shown in view 602 to configuration shown in view 603 (shown in FIG. 6D). In the following example, code 650 is passed to the handler for installation/doors resource 610-7 in a POST command (e.g., from client software in administration device 130). The handler for installation/doors resource 610-7 interprets code 650 and configures handlers to expose interfaces associated with resources as shown in view 603 (see FIG. 6D), as described below.

The handler for installation/doors resource 610-7 interprets code 650. In doing so, the handler for installation/doors resource 610-7 creates and configures an instance of a door resource (portal/doors/1 610-10 in FIG. 6D) such that a configuration interface and an operational interface associated with portal/doors/1 resource 610-10 is exposed to the handler of portal service 610-4. The new instance of the door resource (e.g., portal/door/1 610-10) is given the name "My Front Door" and a maximum open time of 20 seconds (e.g., before sounding an alarm) (see FIG. 6D). The handler for installation/doors resource 610-7 recognizes the "myLock" attribute and passes its value (e.g., link selector 652) to central API engine 330. Central API engine 330 continues in a recursive fashion and is tasked with configuring handler(s) to expose interface(s) for providing resource(s) in a service according to requirements posed by requesting handler (e.g., a link selector) and returning the appropriate information to the requesting handler.

With respect to link selector 652, the "private" value for the "type" attribute indicates that an instance of a lock should be created. In addition, the "private" type may indicate that the configuration interface to the new lock instance should be claimed (e.g., exclusively and/or by using a contract) by the handler for portal/doors/1 610-10. The handler for resource installation/locks 610-9 receives a command (e.g., code 654) for the creation and configuration of the new instance of a lock resource (e.g., locks/1 610-11 in the locks service 610-5) such that the configuration interface and an operational interface associated with locks/1 resource 610-11 is exposed to the handler for portal/ doors/1 610-10. The handler for resource installation/locks resource 610-9 provides the name "My lock" for the resource locks/1 610-11 in the locks service 610-5 (as indicated in code 654). Further, the handler for installation/locks resource 610-9 recognizes the "myOutput" attribute and passes its value (e.g., link selector 656) to central API engine 330. Central API engine 330 continues in a recursive fashion and is tasked with configuring handler(s) to expose interface(s) for providing resource(s) in a service according to requirements posed by requesting handler (e.g., a link selector) and returning the appropriate information to the requesting handler.

With respect to link selector 656, the "use" value for the "type" attribute indicates that a relays instance exists for use. Central API engine 330 then configures the handler for hw/relays/1 610-6 such that the configuration interface associated with hw/relays/1 resource 610-6 is exposed to the handler for locks/1 in the locks service 610-5.

Assuming that there are no errors with respect to the interpretation and implementation of code 650, central API engine 330 returns configuration information for the resource hw/relays/1 610-6 to the handler for installation/locks 610-9; and the configuration information for the resource locks/locks/1 610-11 to the handler for installation/doors.

Figure 7:
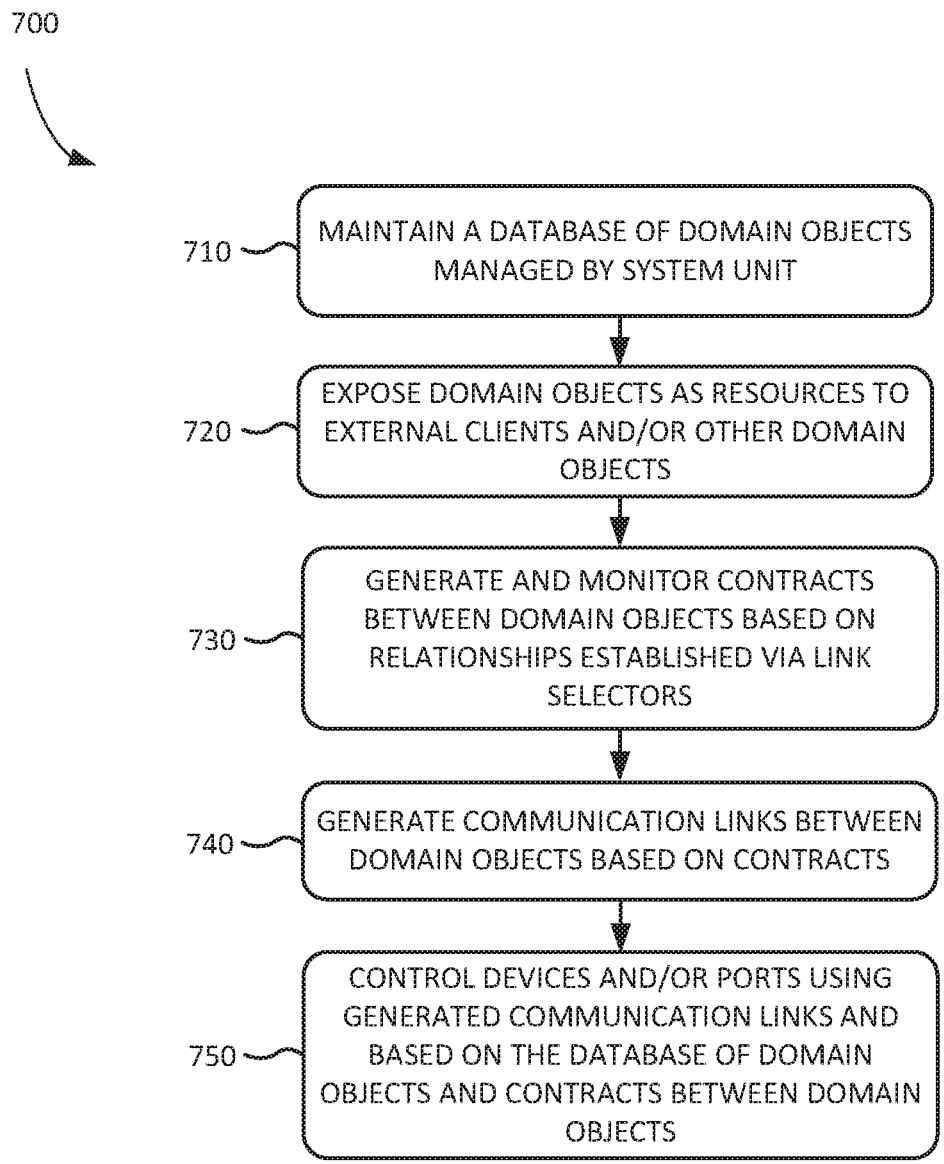
FIG. 7 is a first flowchart for running a resource-based modular system according to one embodiment.

FIG. 7 is a flowchart for a process 700 running a resource-based modular system according to one embodiment. In some implementations, process 700 may be performed by controller 210. In other implementations, some or all of process 700 may be performed by another device or a group of devices separate from controller 210 and/or including controller 210.

Process 700 may include maintaining a database of domain objects managed by a system unit (block 710). For example, configuration server 340 may update domain objects DB 345 based on CRUD requests for resources received from central API engine 330 based on requests received from administration device 130, another system unit 115, and/or based on decisions made by central API engine 330. Process 700 may include exposing domain objects as resources to an external client and/or to other domain objects (block 720). For example, central API engine 330 may enable administration device 130 and/or domain object handlers 360 to access services that include resources and/or collections of resources corresponding to domain objects stored in domain objects DB 345. Administration device 130 may access a service and register a resource included in the service. In response, domain object handler 360 for the type of domain object corresponding to the resource associated with the register request may register the domain object corresponding to the resource and start to execute code or instructions for the registered domain object.

Process 700 may include generating and monitoring contracts between domain objects based on relationships established via the external client (block 730). For example, central API engine 330 may receive and/or identify a request to generate a new contract between a first domain object and a second domain object based on a link selector included in a first domain object and referencing a target resource included in the second domain object. Central API engine 330 may check any existing contracts associated with the target resource to determine whether the target resource is available to form a contract with the first domain object. If the target resource is available (e.g., there are no contracts that commit the target resource to another domain object), central API engine 330 may generate a contract between the first domain object and the second domain object.

Process 700 may further include generating communication links between domain objects based on contracts (block 740). For example, if a new contract is generated between a first domain object and a second domain object, central API engine 330 may instruct link manager 350 to implement a link associated with the link selector for which the contract was generated. Link manager 350 may determine the relationship between the first domain object and the second domain object and establish a communication path between the first domain object and the second domain object based on the relationship.

Process 700 may further include controlling devices and/or ports using the generated communication links and based on the database of domain objects and the contracts between the domain object (block 750). For example, system unit 115 may control one or more locks, relays, GPIO ports, credentials devices, actuators, sensors, camera, and/or other types of devices used to implement access rules for a physical access control system using domain objects DB 345 and the contracts established between the domain objects in domain objects DB 345, with the domain objects representing the one or more locks, relays, GPIO ports, credentials devices, actuators, sensors, camera, and/or other types of devices.

Figure 8:
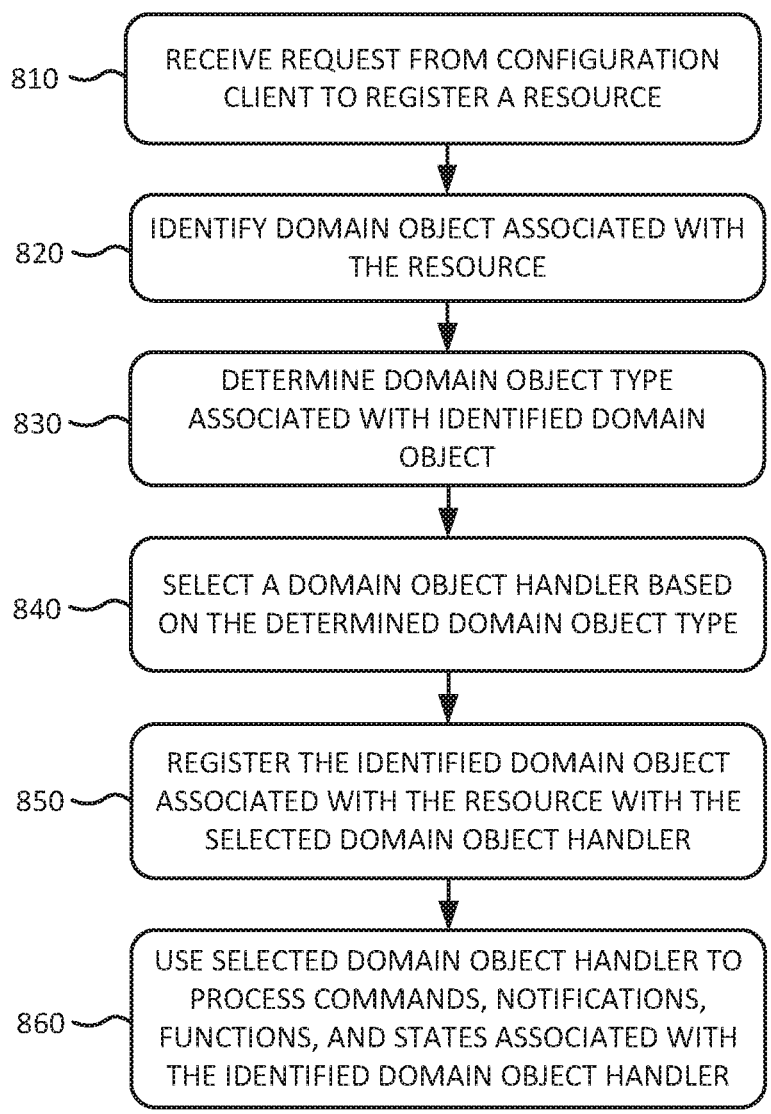
FIG. 8 is a second flowchart for registering a resource according to one embodiment.

FIG. 8 is a flowchart of a process 800 for registering a resource according to one embodiment. In some implementations, process 800 may be performed by controller 210. In other implementations, some or all of process 800 may be performed by another device or a group of devices separate from controller 210 and/or including controller 210.

Process 800 may include receiving a request from a configuration client to register a resource (block 810). For example, an administrator may install a new peripheral device 230 to be controlled by controller 210 and may request to register a new resource for the new peripheral device 230 by accessing a secure web page hosted by controller 210 using a web browser application running on administration device 130. The administrator may select a resource from a resource collection and/or service that includes resource instances for the type of new peripheral device 230 and may register the resource and associate the resource with the new peripheral device 230. For example, the administrator may select a resource associated with a particular port to which the new peripheral device 230 is connected or may select a resource that represents the new peripheral device 230.

In some implementations, controller 210 may auto-detect when a new peripheral device 230 is connected to controller 210, generate a domain object and one or more resources available in the domain object, and may make the one or more resource available in particular services (e.g., particular collections of resources). For each of the one or more resources, controller 210 may select one or more interfaces associated with the domain object. Each interface specification may include a name or ID for an interface, a type for the interface (e.g., a command interface to send instructions to a resource or a notification interface to receive notifications from a resource), a schema that specifies the format of the interface (e.g., required fields, optional fields, and accepted data types for each field), commands that may be sent via the interface, and/or notifications that may be received via the interface.

A domain object associated with the resource may be identified (block 820). For example, central API engine 330 may identify domain object 400 associated with the resource identified in the request based on information stored in domain objects DB 345. A domain object type associated with the identified domain object may be determined (block 830), a domain object handler associated with the identified domain object type may be selected (block 840), and the identified domain object associated with the resource may be registered with the selected domain object handler (block 850). For example, central API engine 330 may identify the domain object type based on information stored in domain objects DB 345 and/or based on the service (e.g., resource collection) from which the resource instance was selected.

Central API engine 330 may select domain object handler 360 associated with the identified domain object type based on, for example, a mapping between domain object handlers 360 and domain object types maintained by central API engine 330. Central API engine 330 may then register the identified domain object with the selected domain object handler 360. For example, central API engine 330 may instruct configuration server 340 to update the identified domain object in domain objects DB 345 to identify that the identified domain object has been registered with the selected domain object handler 360 (e.g., in handler field 422). Additionally, or alternatively, the selected domain object handler 360 may store information identifying the registered domain object in memory (e.g., in domain object logic 362). Thus, each domain object handler 360 may store information in memory identifying the domain object instances that have been registered with, and are being handled by, the domain object handler 360.

The selected domain object handler may be used to process commands, notifications, functions, and/or states associated with the registered domain object (block 860). For example, the selected domain object handler 360 may send commands to a device or port, or to a target resource of another domain object on behalf of the registered domain object; receive notifications from a device or port, or from a target resource of another domain object on behalf of the registered domain object; maintain state information associated with the registered domain object (e.g., whether a door is open or closed, how long a door has remained open, whether a lock is locked or unlocked, a set of credentials entered into a credentials reader device, etc.); define a script associated with the registered domain object and carry out one or more functions defined in the script (e.g., processing an access rule, carrying out a conditional command based on a particular state, etc.); and/or may perform other processes associated with the registered domain object. The script may specify a particular instruction to be sent to the device or port associated with the registered domain objector, or to another resource, when a particular type of event is detected by the registered domain object. For example, the script may define an access rule that grants or denies access to an area by controlling the device or port or the other resource. The selected domain object handler 360 may perform these processes to control a device or port, or to control a target resource associated with another domain object.

Figure 9:
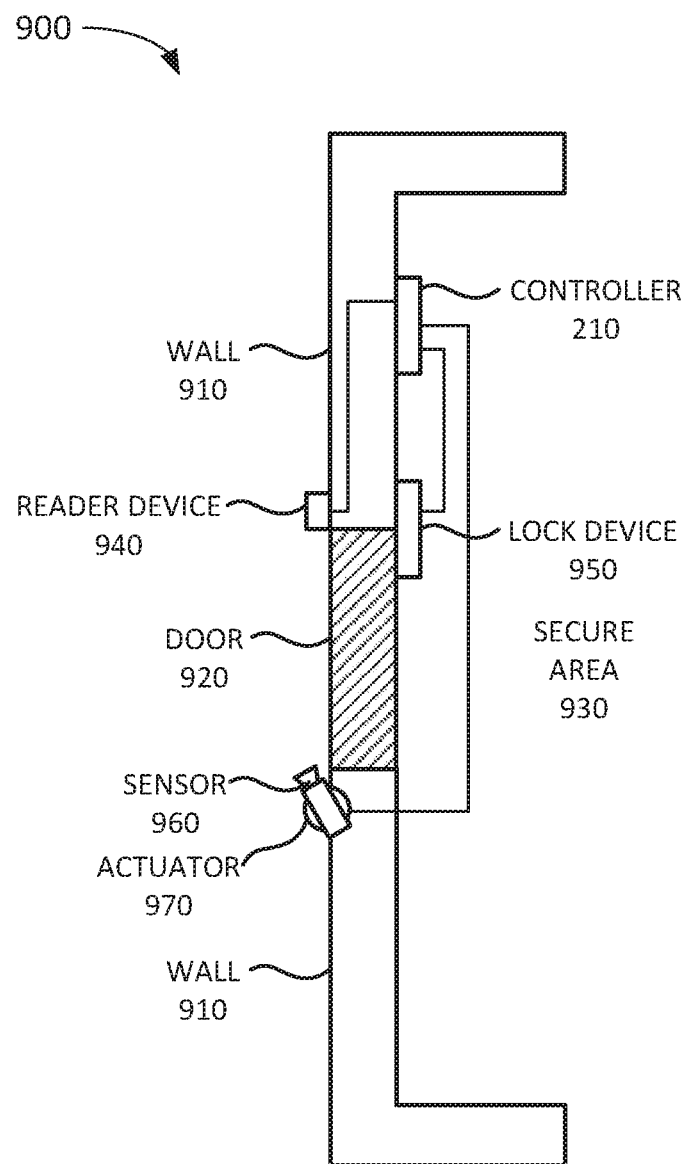
FIG. 9 is a floor plan diagram illustrating an exemplary physical layout of associated with the controller device of FIG. 2A according to an embodiment.

FIG. 9 is a floor plan diagram illustrating an exemplary physical layout 900 of associated with the controller device of FIG. 2A that illustrates the relationship of controller 210 to peripheral devices 230. As shown in FIG. 9, physical layout 900 may include a wall 910, a door 920, a secure area 930, controller 210, a reader device 940, a lock device 950, a sensor 960, and an actuator 970.

Wall 910 encloses a secure area 930, such as a room in a building. Door 920 provides access for a user to secure area 930. Controller 210 may be installed inside secure area 930. Reader device 940 may be installed outside secure area 930 and lock device 950 is installed inside secure area 930 to wall 910 and door 920. Sensor 960, in this example, is a monitoring device mounted outside secure area 930 in an insecure area outside door 920. Actuator 270 may include a motor used to control the field of view of sensor 960.

When a user enters credentials into reader device 940 (e.g., by entering a PIN, scanning an access card, or scanning an iris), controller 210 may use the credentials to authenticate the identity of the user and may perform a lookup in an access rules table to determine whether to grant access to the user based on the identity of the user and the access rules. If controller 210 determines that access should be granted, controller 210 activates lock device 950 to unlock door 920, thus granting access to the user to secure area 930. Sensor 960 may be used to obtain additional information relating to the access rules, such by providing additional authentication of a user (e.g., facial recognition or gait pattern recognition), detecting security breaches (e.g., detecting another unauthorized user nearby while a user is trying to gain access), implementing a people counting application, and/or implementing another type of application or service related to the access rules for secure area 930.

Although FIG. 9 shows exemplary components of physical layout 900, in other implementations, physical layout 900 may include fewer components, different components, additional components, or differently arranged components than depicted in FIG. 9. Additionally, or alternatively, any one component (or group of components) in physical layout 900 may perform a task or tasks described as performed by one or more other components of physical layout 900.

Figure 10:
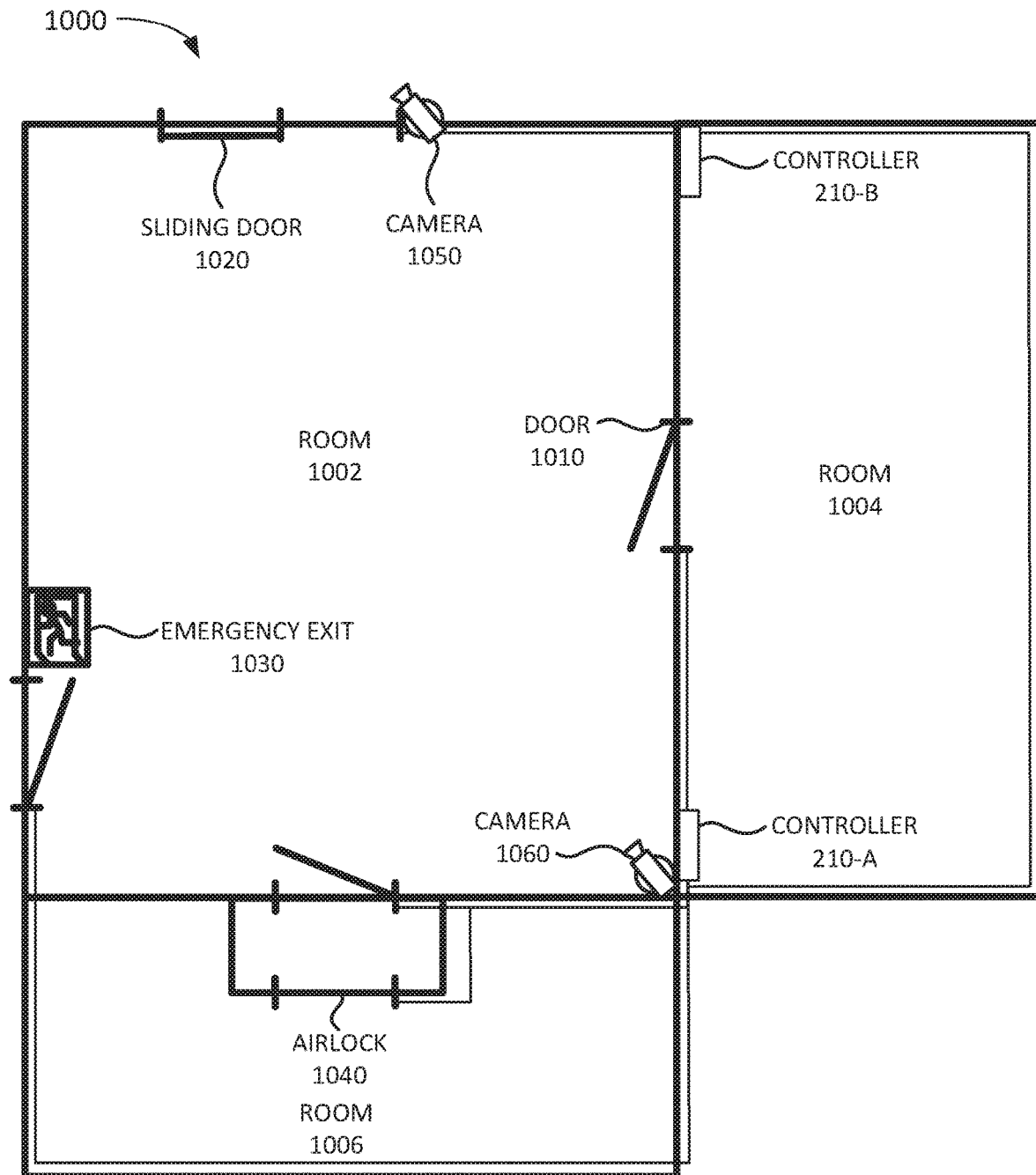
FIG. 10 is a floor plan diagram illustrating an exemplary physical layout associated with the controller device of FIG. 9 according to an embodiment.

FIG. 10 is a floor plan diagram illustrating an exemplary physical layout 1000 associated with controller device 210 of FIG. 9. As shown in FIG. 10, physical layout 1000 may include a part of a building that includes a first room 1002, a second room 1004, and a third room 1006. Room 1002 may include a door 1010 into room 1004, a sliding door 1020 into room 1002, an emergency exit 1030, and an airlock 1040 into room 1006. Controller 210-A may be located in room 1004 and may control door 1010, emergency exit 1030, airlock 1040, and camera 1060. Controller 210-B may also be located in room 1004 and may control sliding door 1020 and camera 1050.

Figure 11A:
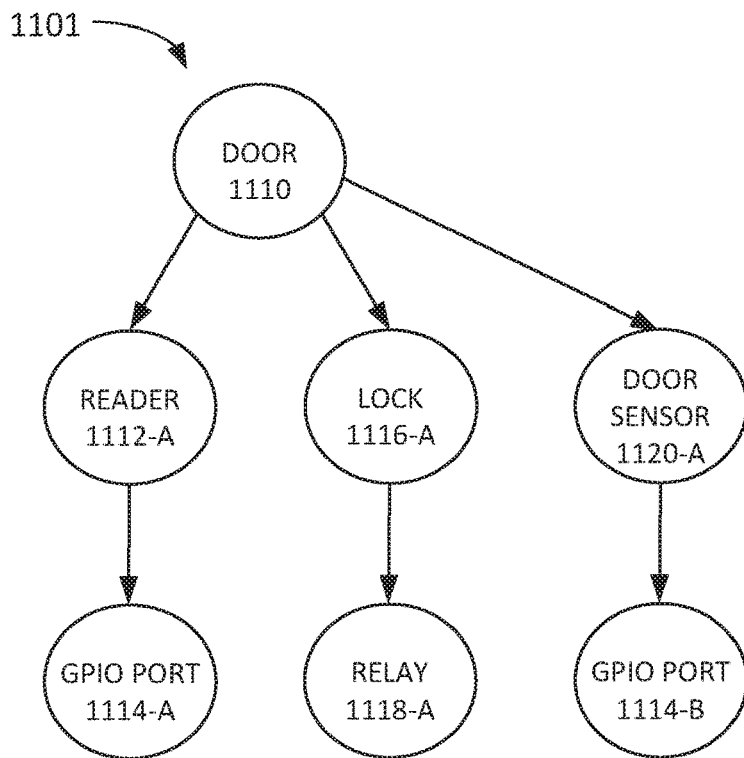
FIGS. 11A-11E are diagrams of exemplary resources according to an embodiment.

FIGS. 11A-11E are diagrams of exemplary resources associated with physical layout 1000 as perceived and configured by a configuration client (e.g., administration device 130). Each resource in FIGS. 11A-11E is associated with a domain object in domain objects DB 345. FIG. 11A is a diagram 1101 illustrating a door resource 1110 associated with door 1010 of FIG. 10. As shown in FIG. 11A, door resource 1110 may include a link to a reader resource 1112-A and reader resource 1112-A may include a link to a GPIO port resource 1114-A. Furthermore, door resource 1110 may include a link to a lock resource 1116-A and lock resource 1116-A may include a link to relay resource 1118-A. Additionally, door resource 1110 may include a link to a door sensor resource 1120-A and door sensor resource 1120-A may include a link to a GPIO port resource 1114-B. Each link shown in FIG. 11A may be generated based on a link selector and reader resource 1112-A, lock resource 1116-A, and door sensor resource 1120-A may be designated as server resources with respect to door resource 1110. GPIO port resource 1114-A may be associated with a domain object corresponding to a GPIO port that connects to a card reader device. Relay resource 1118-A may be associated with a domain object corresponding to a relay that activates and deactivates a lock (e.g., lock device 950). GPIO port resource 1114-B may be associated with a domain object corresponding to a GPIO port that connects to a door sensor device.

Door resource 1110 may include one or more functions associated with door 1010, such as, for example, enforcing a maximum length of time that door 1010 is allowed to be unlocked before the lock is activated, counting a number of times door 1010 was opened during a particular time period, counting a number of times invalid credentials were input into the reader device, and/or other types of instructions.

Figure 11B:
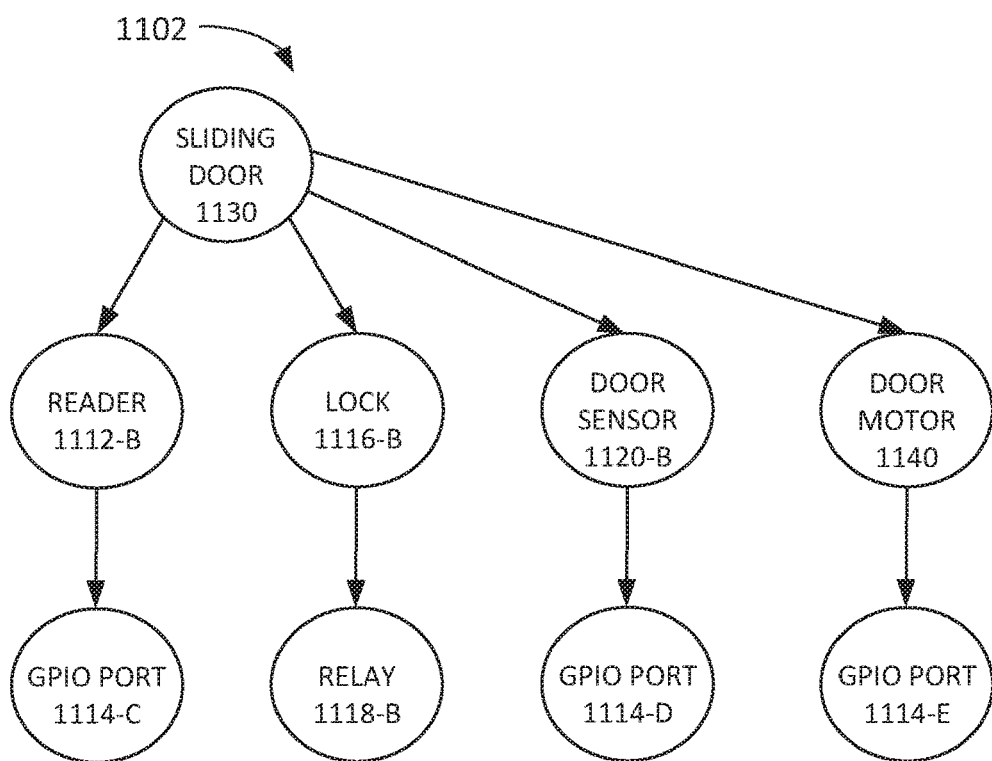

FIG. 11B is a diagram 1102 illustrating a sliding door resource 1130 associated with sliding door 1020 of FIG. 10. As shown in FIG. 11B, sliding door resource 1130 may include a link to a reader resource 1112-B and reader resource 1112-B may include a link to a GPIO port resource 1114-C. Furthermore, sliding door resource 1130 may include a link to a lock resource 1116-B and lock resource 1116-B may include a link to relay resource 1118-B. Additionally, sliding door resource 1130 may include a link to a door sensor resource 1120-B and door sensor resource 1120-B may include a link to a GPIO port resource 1114-D. Moreover, sliding door resource 1130 may include a link to a door motor resource 1140 and door motor resource 1140 may include a link to a GPIO port resource 1114-E. Each link shown in FIG. 11B may be generated based on a link selector and reader resource 1112-B, lock resource 1116-B, door sensor resource 1120-B, and door motor resource 1140 may be designated as server resources with respect to sliding door resource 1130.

GPIO port resource 1114-C may be associated with a domain object corresponding to a GPIO port that connects to a card reader device. Relay resource 1118-B may be associated with a domain object corresponding to a relay that activates and deactivates a lock (e.g., lock device 950). GPIO port resource 1114-D may be associated with a domain object corresponding to a GPIO port that connects to a door sensor device. GPIO port resource 1114-E may be associated with a domain object corresponding to a GPIO port that connects to a door motor device that moves sliding door open and closed.

Comparing door resource 1110 and sliding door resource 1130, it can be seen that an existing domain object may be used as a template to generate additional domain objects. For example, a sliding door may have the same functionality as a regular door with the addition of a door motor to slide the door open and closed. Thus, an existing door resource 1110 may be used to generate sliding door resource 1130 by adding an additional link selector to existing door resource 1110 to link to door motor resource 1140.

Figure 11C:
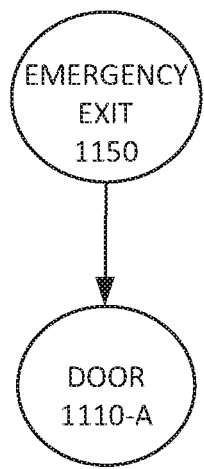

FIG. 11C is a diagram 1103 illustrating an emergency exit resource 1150 associated with emergency exit 1030 of FIG. 10. As shown in FIG. 11C, emergency exit resource 1150 may include a link to door resource 1110-A. The link from emergency exit resource 1150 to door resource 1110-A may be generated based on a link selector and door resource 1110-A may be designated as a server resource with respect to emergency exit resource 1150. Emergency exit resource 1150 may include a function that causes door 1110-A to open in an emergency. For example, emergency exit resource 1150 may receive notifications from a fire alarm resource, a smoke detector resource, and/or another type of resource associated with detecting emergency situations in room 1002 (not shown in FIG. 11C). Thus, additional functionality may be added to an existing resource by creating a new resource that links to the existing resource.

Figure 11D:
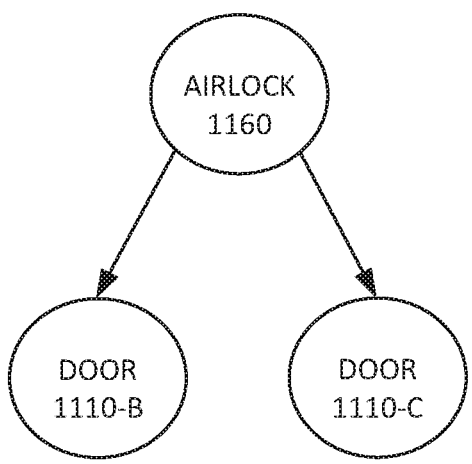

FIG. 11D is a diagram 1104 illustrating an airlock resource 1160 associated with airlock 1040 of FIG. 10. As shown in FIG. 11C, airlock resource 1160 may include a link to a first door resource 1110-B and to a second door resource 1110-C. The link from airlock resource 1160 to door resources 1110-B and 1110-C may be generated based on link selectors and door resources 1110-B and 1110-C may be designated as a server resources with respect to airlock resource 1160. Airlock resource 1160 may include a function to implement an airlock that ensures that only one door is open at a time and that the two doors are never both open at the same time. Thus, if the door associated with door resource 1110-B is open, airlock resource 1160 may instruct door resource 1110-C to remain locked. Therefore, additional functionality may be added to an existing domain object by creating a new domain object that links to multiple existing resources.

Figure 11E:
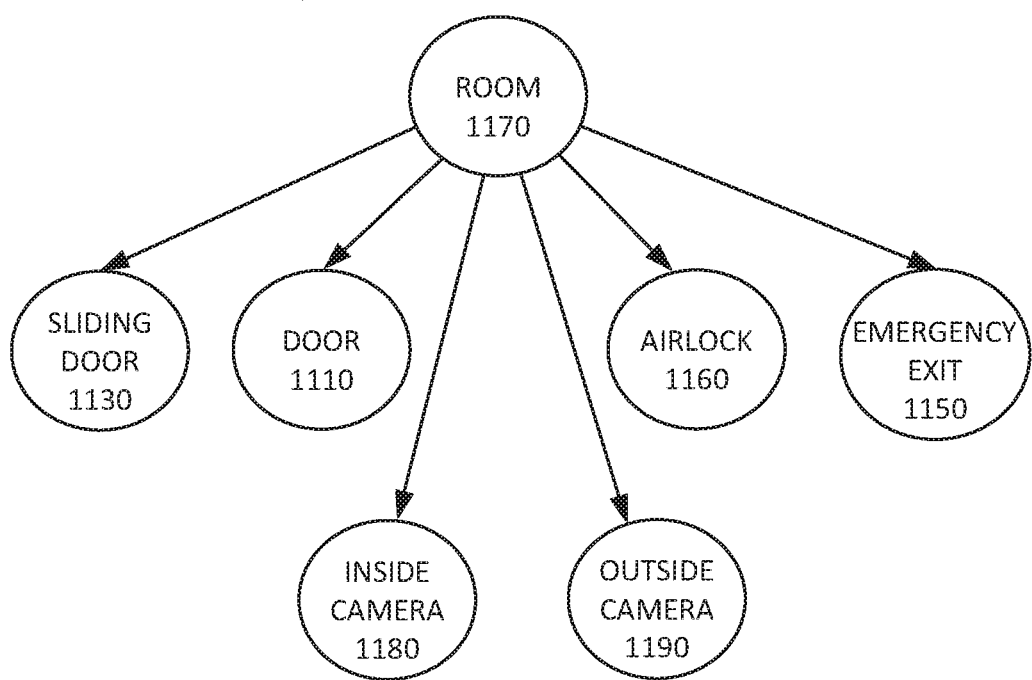

FIG. 11E is a diagram 1105 illustrating a room resource 1170 associated with room 1002. As shown in FIG. 11E, room resource 1170 may include a link to sliding door resource 1130, a link to door resource 1110, a link to airlock resource 1160, a link to emergency exit resource 1150, a link to an inside camera resource 1180, and a link to an outside camera resource 1190. Inside camera resource 1180 may be located in controller 210-A and may correspond to camera 1060 and outside camera resource 1190 may be located in controller 210-B and may correspond to camera 1050. The links from room resource 1170 to sliding door resource 1130, door resource 1110, airlock resource 1160, emergency exit resource 1150, inside camera resource 1180, and outside camera resource 1190 may be generated based on link selectors and sliding door resource 1130, door resource 1110, airlock resource 1160, emergency exit resource 1150, inside camera resource 1180, and outside camera resource 1190 may be designated as a server resources with respect to room resource 1170.

Room resource 1170 may include additional functionality that may be applied to sliding door resource 1130, door resource 1110, airlock resource 1160, and emergency exit resource 1150. For example, room resource 1170 may apply a set of access rules to sliding door resource 1130, door resource 1110, airlock resource 1160, and emergency exit resource 1150, such as which credentials are authorized to open particular doors during particular time periods (e.g., a first set of credentials during business hours and a second set of credentials in the evening), notifications that are to be provided to room resource 1170 (e.g., the number of times a door has been opened during a particular time period), actions to date during an emergency or a security incident (e.g., an instruction to lock all doors during a security incident), and/or other types of access rules.

Furthermore, room resource 1170 may include one or more rules based on events detected by camera 1050 or camera 1060. As an example, if camera 1050 detects a security threat outside the building, such as an intruder, outside camera resource 1190 may send a notification to room resource 1170 via an established link and room resource 1170 may, in response, send a "lock" instruction to sliding door resource 1130, door resource 1110, airlock resource 1160, and emergency exit resource 1150. As another example, if camera 1060 detects a fire inside room 1002, inside camera resource 1180 may send a notification to room resource 1170 via an established link and room resource 1170 may, in response, send an open instruction to emergency exit resource 1150, airlock resource 1160, and door resource 1110. Alternatively, room resource 1170 may send a "close, but do not lock" instruction to airlock resource 1160 and door resource 1110 in response to a fire event notification, if no people are present in room 1006 and room

1004. The presence of people may be tracked using a people counting application associated with airlock resource 1160 and/or door resource 1110.

Figure 12A:
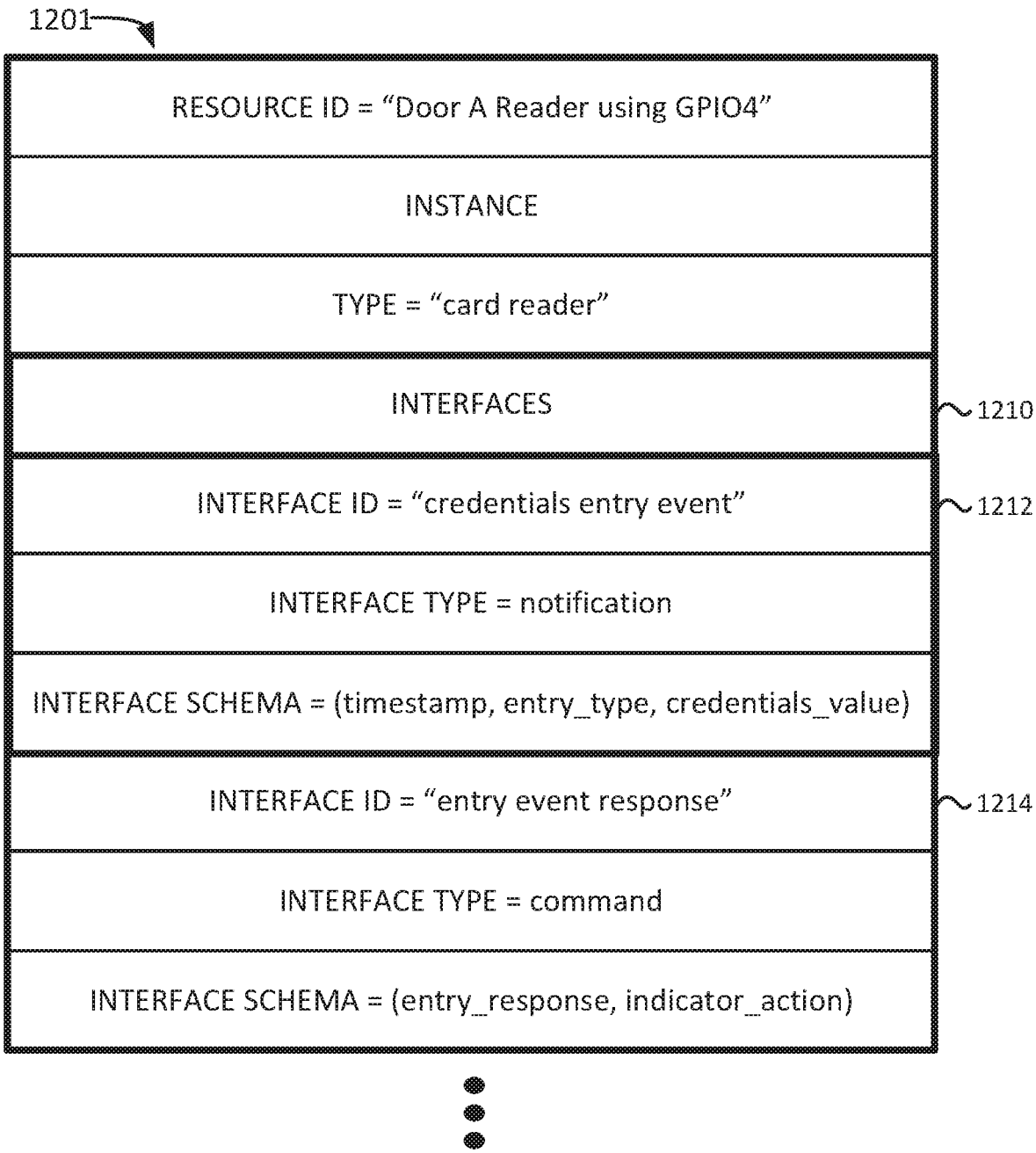

FIGS. 12A-12D are diagrams of an exemplary domain object according to one embodiment. FIG. 12A illustrates a card reader domain object record 1201 corresponding to card reader resource 1112-A. As shown in FIG. 12A, card reader domain object record 1201 includes an interfaces field 1210 that includes a first interface entry 1212 and a second interface entry 1214. First interface entry 1212 specifies a notification interface for reporting credentials entry events reported by a card reader associated with card reader resource 1112-A. Second interface entry 1214 specifies a command interface for providing a response to a credentials entry. For example, after a user swipes an entry card, the command interface may be used to activate a green light emitting diode (LED) in the card reader if the credentials entry grants access and activate a red LED in the card reader if the credentials entry denies access.

Figure 12B:
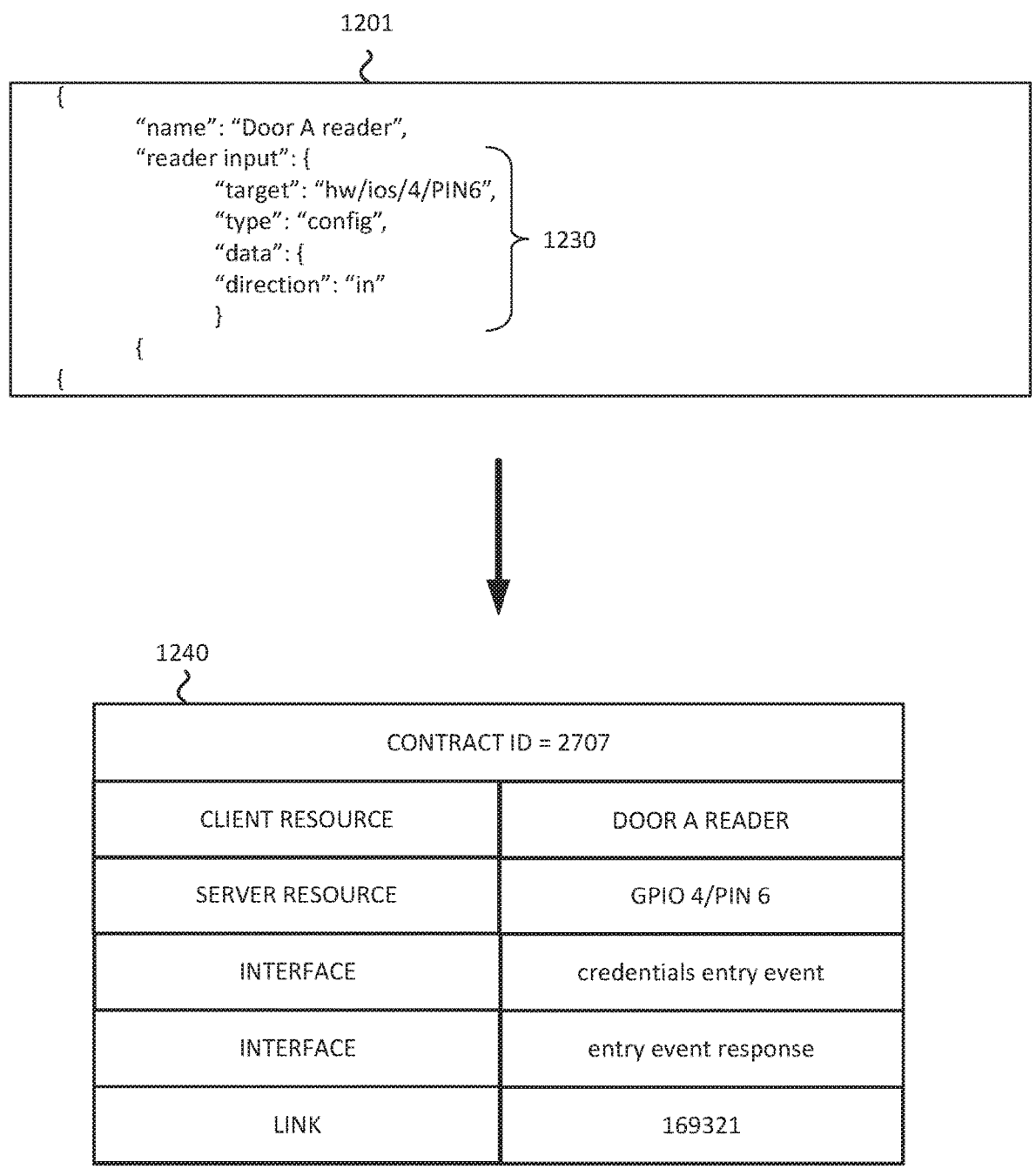

FIG. 12B illustrates contract generation 1202 based on a link selector. Contract generation 1202 may result in contract 1240 based on a link selector 1230 included in card reader domain object record 1201. Link selector 1230 corresponds to a configuration type link selector that enables card reader resource 1112-A to control a card reader device via a GPIO port. The link selector configured configures pin 6 of GPIO 4 as an input pin for receiving card reader credentials input data. Contract 1240 specifies that pin 6 of GPIO port 4 is contracted to card reader resource 1112-A as an input pin using the "credentials entry event" interface.

FIG. 12C illustrates a link record 1250 in link DB 355 for a link generated based on link selector 1230 after contract 1240 is generated. In this case, card reader resource 1112-A and GPIO port resource 1114-A are associated with different processes managed by logic runner 370. Consequently, link manager 350 may generate a socket for card reader resource 1112-A, connect the socket to GPIO port resource 1114-A, and instruct card reader resource 1112-A to read and write data to the generated socket when communicating with GPIO port resource 1114-A.

FIG. 12D illustrates domain object logic 362 associated with card reader resource 1112-A. As shown in FIG. 12D, domain object logic 362 may include a first function 1262 and a second function 1264. First function 1262 may receive credentials data from the card reader device via an API and may generate a notification using interface 1212. Second function 1264 may generate an entry event response command to the card reader device based on an instruction received via interface 1214.

Figure 13:
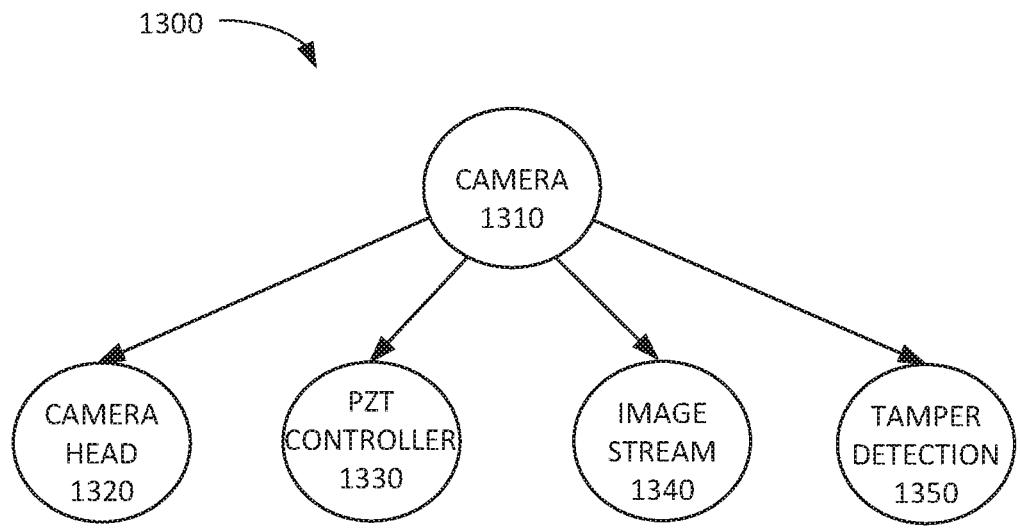
FIG. 13 is a diagram of another exemplary resource according to another embodiment.

FIG. 13 is a diagram 1300 illustrating an exemplary camera resource 1310 associated with a camera system (e.g., an implementation in which system unit 115 corresponds to a camera system). As shown in FIG. 13, camera resource 1300 may include a link to a camera head resource 1320, a link to a PZT controller resource 1330, a link to an image stream resource 1340, and a link to a tamper detection resource 1350. Camera head resource 1320 may correspond to a domain object associated with a peripheral device 230 that includes a camera head with a lens system. For example, the link from camera resource 1310 to camera head resource 1320 may set a sampling rate for a set of image capturing sensors.

PZT controller resource 1330 may correspond to a domain object associated with a peripheral device 230 that includes a PZT motor assembly. For example, the link from camera resource 1310 to PZT controller resource 1330 may set a particular pan, tilt, and/or zoom setting for the PZT motor assembly. Image stream resource 1340 may correspond to a domain object that includes the functionality to generate an image stream based on images captured by the camera head. For example, the link from camera resource 1310 to image stream resource 1340 may configure the image stream resource 1340 to generate an image stream at a particular resolution or frame rate, set a compression parameter, set a noise reduction parameter, etc. Tamper detection resource 1350 may correspond to a domain object that includes functionality to detect tampering with the camera system, such as attempts to damage or cover the camera system. For example, the link from camera resource 1310 to tamper detection resource 1350 may be used to receive tamper detection notifications from the tamper detection domain object.

Figure 14:
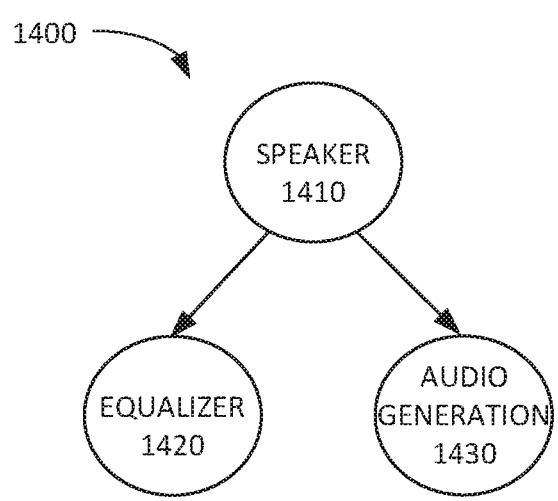
FIG. 14 is a diagram of yet another exemplary resource according to yet another embodiment.

FIG. 14 is a diagram 1400 illustrating an exemplary speaker resource 1410 associated with a audio generation system (e.g., an implementation in which system unit 115 corresponds to a speaker system). As shown in FIG. 14, speaker resource 1410 may include a link to an equalizer resource 1420 and a link to an audio generation resource 1430. Equalizer resource 1410 may correspond to a domain object that includes functionality to equalize the sound output of the speaker system. Audio generation resource 1430 may correspond to a domain object associated with a peripheral device 230 that generates audio.

This application incorporates by reference the following applications filed the same day as the present patent application: Ser. No. 16/731,892, titled "Link Selector in a Modular Control System"; Ser. No. 16/731,895, titled "Dynamic Transport Setup in a Modular Control System"; Ser. No. 16/731,913, titled "Fallback Command in Modular Control System"; and Ser. No. 16/731,922, titled "Resource View in Modular Control System."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7 and 8, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

The invention claimed is:

1. A method, performed by a computer device, the method comprising:
   presenting, by the computer device, a first resource of a domain object, wherein the first resource is associated with a first interface of the domain object to configure the domain object;
   receiving, by the computer device and from a configuration client device, a request to register the first resource;
   identifying, by the computer device, the domain object associated with the first resource, wherein the domain object corresponds to a logical entity representing a device or port, or corresponds to a logical entity controlling a target resource included in another domain object, and wherein the domain object includes a second resource associated with a second interface to control or use the domain object;
   selecting, by the computer device, a domain object handler for the identified domain object;
   registering, by the computer device, the identified domain object with the selected domain object handler; and
   using, by the computer device, the selected domain object handler to process messages associated with the registered domain object using the second resource, the device or port, or the target resource of the other domain object.

2. The method of claim 1, further comprising:
   determining a domain object type associated with the identified domain object; and
   selecting the domain object handler based on the determined domain object type.

3. The method of claim 1, further comprising:
   receiving an update request from the configuration client device for the registered domain object, wherein the update request includes an instruction to add a link selector to the identified domain object; and
   updating the registered domain object based on the received update request.

4. The method of claim 1, further comprising:
   assigning a process identifier to the registered domain object, wherein the process identifier is associated with the selected domain object handler.

5. The method of claim 1, further comprising:
   maintaining state information associated with the registered domain object, wherein the state information indicates a state of the device or port, or of the target resource.

6. The method of claim 1, further comprising:
   defining a script for the registered domain object, wherein the script specifies a particular instruction to be sent to the device or port or the target resource when a particular type of event is detected by the registered domain object.

7. The method of claim 1, wherein the registered domain object controls at least one of a door, a lock, a relay, an input/output port, an access credentials input device, or a door actuator.

8. The method of claim 1, further comprising:
   generating a collection of resources under a service; and
   exposing the collection of resources to the configuration client device when a configuration client accesses the service.

9. The method of claim 1, further comprising:
   identifying a link selector associated with the registered domain object, wherein the link selector corresponds to an attribute of the domain object that specifies how the target resource of the other domain object is to be controlled by the registered domain object;
   generating a contract between the registered domain object and the other domain object, wherein the contract indicates that the registered domain object is to control the target resource of the other domain object and that the target resource is not available to be controlled by other domain objects; and
   generating a communication path from the registered domain object to the other domain object based on the identified link selector.

10. The method of claim 6, wherein the script defines an access rule that grants or denies access to an area by controlling the device or port or the target resource.

11. A device comprising:
    a memory storing instructions; and
    a processor configured to execute the instructions to:
       present, to a configuration client device, a first resource of a domain object, wherein the first resource is associated with a first interface of the domain object to configure the domain object;
       receive, from the configuration client device, a request to register the first resource;
       identify the domain object associated with the first resource, wherein the domain object corresponds to a logical entity representing a device or port, or corresponds to a logical entity controlling a target resource included in another domain object, and wherein the domain object includes a second resource associated with a second interface to control or use the domain object;
       select a domain object handler for the identified domain object;
       register the identified domain object with the selected domain object handler; and
       use the selected domain object handler to process messages associated with the registered domain object using the second resource, the device or port, or the target resource of the other domain object.

12. The device of claim 11, wherein the processor is further configured to:
    determine a domain object type associated with the identified domain object; and
    select the domain object handler based on the determined domain object type.

13. The device of claim 11, wherein the processor is further configured to:
    receive an update request from the configuration client device for the registered domain object, wherein the update request includes an instruction to add a link selector to the identified domain object; and
    update the registered domain object based on the received update request.

14. The device of claim 11, wherein the processor is further configured to:
    assign a process identifier to the registered domain object, wherein the process identifier is associated with the selected domain object handler.

15. The device of claim 11, wherein the processor is further configured to:
maintain state information associated with the registered domain object, wherein the state information indicates a state of the device or port, or of the target resource.

16. The device of claim 11, wherein the processor is further configured to:
define a script for the registered domain object, wherein the script defines an access rule that grants or denies access to an area by controlling the device or port or the target resource.

17. The device of claim 11, wherein the registered domain object controls at least one of a door, a lock, a relay, an input/output port, an access credentials input device, or a door actuator.

18. The device of claim 11, wherein the processor is further configured to:
generate a collection of resources under a service; and
expose the collection of resources to the configuration client device when a configuration client accesses the service.

19. The device of claim 11, wherein the processor is further configured to:
identify a link selector associated with the registered domain object, wherein the link selector corresponds to an attribute of the domain object that specifies how the target resource of the other domain object is to be controlled by the registered domain object;
generate a contract between the registered domain object and the other domain object, wherein the contract indicates that the registered domain object is to control the target resource of the other domain object and that the target resource is not available to be controlled by other domain objects; and
generate a communication path from the registered domain object to the other domain object based on the identified link selector.

20. A non-transitory computer-readable memory device storing instructions executable by a processor, the non-transitory computer-readable memory device comprising:
one or more instructions to present, to a configuration client device, a first resource of a domain object, wherein the first resource is associated with a first interface of the domain object to configure the domain object;
one or more instruction to receive, from the configuration client device, a request to register the first resource;
one or more instruction to identify the domain object associated with the first resource, wherein the domain object corresponds to a logical entity representing a device or port, or corresponds to a logical entity controlling a target resource included in another domain object, and wherein the domain object includes a second resource associated with a second interface to control or use the domain object;
one or more instruction to select a domain object handler for the identified domain object;
one or more instruction to register the identified domain object with the selected domain object handler; and
one or more instruction to use the selected domain object handler to process messages associated with the registered domain object using the second resource, the device or port, or the target resource of the other domain object.

* * * * *